United States Patent
Da Silva et al.

(10) Patent No.: US 11,950,315 B2
(45) Date of Patent: Apr. 2, 2024

(54) USER EQUIPMENT, RADIO NETWORK NODE AND METHODS PERFORMED THEREIN FOR HANDLING COMMUNICATION

(71) Applicant: Telefonaktiebolaget LM Ericsson (publ), Stockholm (SE)

(72) Inventors: Icaro L. J. Da Silva, Solna (SE); Patrik Rugeland, Stockholm (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 359 days.

(21) Appl. No.: 17/423,647

(22) PCT Filed: Mar. 18, 2020

(86) PCT No.: PCT/SE2020/050287
§ 371 (c)(1),
(2) Date: Jul. 16, 2021

(87) PCT Pub. No.: WO2020/197469
PCT Pub. Date: Oct. 1, 2020

(65) Prior Publication Data
US 2022/0046747 A1 Feb. 10, 2022

Related U.S. Application Data

(60) Provisional application No. 62/823,033, filed on Mar. 25, 2019.

(51) Int. Cl.
*H04W 76/28* (2018.01)
*H04W 12/041* (2021.01)
(Continued)

(52) U.S. Cl.
CPC ......... *H04W 76/28* (2018.02); *H04W 12/041* (2021.01); *H04W 52/0229* (2013.01);
(Continued)

(58) Field of Classification Search
CPC ..... H04W 76/28; H04W 76/34; H04W 76/15; H04W 12/041; H04W 52/0229; H04W 76/27
(Continued)

(56) References Cited

U.S. PATENT DOCUMENTS

2017/0359747 A1  12/2017 Lunden et al.
2018/0270682 A1  9/2018 Zacharias et al.
(Continued)

FOREIGN PATENT DOCUMENTS

CN  108924949 A  11/2018
CN  110419234 A  11/2019
(Continued)

OTHER PUBLICATIONS

Martinez Tarradell Marta (WO 2018/232124 A1) Apparatus of GNB to Enable an Inactive Mode in Dual Connectivity Dec. 20, 2018.*
(Continued)

*Primary Examiner* — Nghi H Ly
(74) *Attorney, Agent, or Firm* — Murphy, Bilak & Homiller, PLLC

(57) ABSTRACT

A method UE for receiving configuration data in a wireless communication network is provided. The UE receives configuration data to configure the UE with early measurement configuration, which the UE (10) will use to perform measurements in dormant state and with one or more SCG configuration(s) that are to be stored by the UE and/or the radio network node, while the UE (10) is in dormant state. The UE performs (605) early measurements in a dormant state according to the early measurement configuration.

(Continued)

Upon transition to a connected mode, the UE compares (606) the early measurements to one or more trigger conditions associated with the one or more SCG configurations.Publ.

21 Claims, 18 Drawing Sheets

(51) Int. Cl.
  *H04W 52/02* (2009.01)
  *H04W 76/15* (2018.01)
  *H04W 76/27* (2018.01)
  *H04W 76/34* (2018.01)

(52) U.S. Cl.
  CPC .......... *H04W 76/15* (2018.02); *H04W 76/34* (2018.02); *H04W 76/27* (2018.02)

(58) Field of Classification Search
  USPC ........ 370/311, 328, 329, 338, 341, 345, 350
  See application file for complete search history.

(56) References Cited

U.S. PATENT DOCUMENTS

| | | | | |
|---|---|---|---|---|
| 2018/0368205 | A1* | 12/2018 | Park | H04W 76/30 |
| 2020/0022207 | A1 | 1/2020 | Yu et al. | |
| 2020/0288338 | A1* | 9/2020 | Freda | H04W 76/19 |

FOREIGN PATENT DOCUMENTS

| | | |
|---|---|---|
| WO | 2015064972 A1 | 5/2015 |
| WO | 2018174791 A1 | 9/2018 |
| WO | 2019031827 A1 | 2/2019 |

OTHER PUBLICATIONS

"3GPP TS 36.331 V15.4.0", 3rd Generation Partnership Project; Technical Specification Group Radio Access Network; Evolved Universal Terrestrial Radio Access (E-UTRA); Radio Resource Control (RRC); Protocol specification (Release 15), Dec. 2018, pp. 1-933.

"New WID on DC and CA enhancements (NR_DCCA_Enh)", 3GPP TSG-RAN#80; RP-181469; La Jolla, CA, USA, Jun. 11-14, 2018, pp. 1-5.

"RRC_INACTIVE with MR_DC", 3GPP TSG-RAN WG3 Meeting NR Ad-Hoc 2; R3-172430; Qingdao, China, Jun. 27-29, 2017, pp. 1-6.

"WID on Multi-RAT Dual-Connectivity and Carrier Aggregation enhancements (LTE_NR_DC_CA_enh-Core)", 3GPP TSG-RAN#81; RP-182076; Gold Coast, Australia, Sep. 10-13, 2018, pp. 1-5.

"3GPP TS 36.133 V16.0.0", 3rd Generation Partnership Project; Technical Specification Group Radio Access Network; Evolved Universal Terrestrial Radio Access (E-UTRA); Requirements for support of radio resource management (Release 16), Dec. 2018, pp. 1-3563.

"3GPP TS 38.331 V15.4.0", 3rd Generation Partnership Project; Technical Specification Group Radio Access Network; NR; Radio Resource Control (RRC) protocol specification (Release 15), Dec. 2018, pp. 1-474.

"3GPP TS 38.331 V15.5.0", 3rd Generation Partnership Project; Technical Specification Group Radio Access Network; NR; Radio Resource Control (RRC) protocol specification (Release 15), Mar. 2019, pp. 1-491.

* cited by examiner

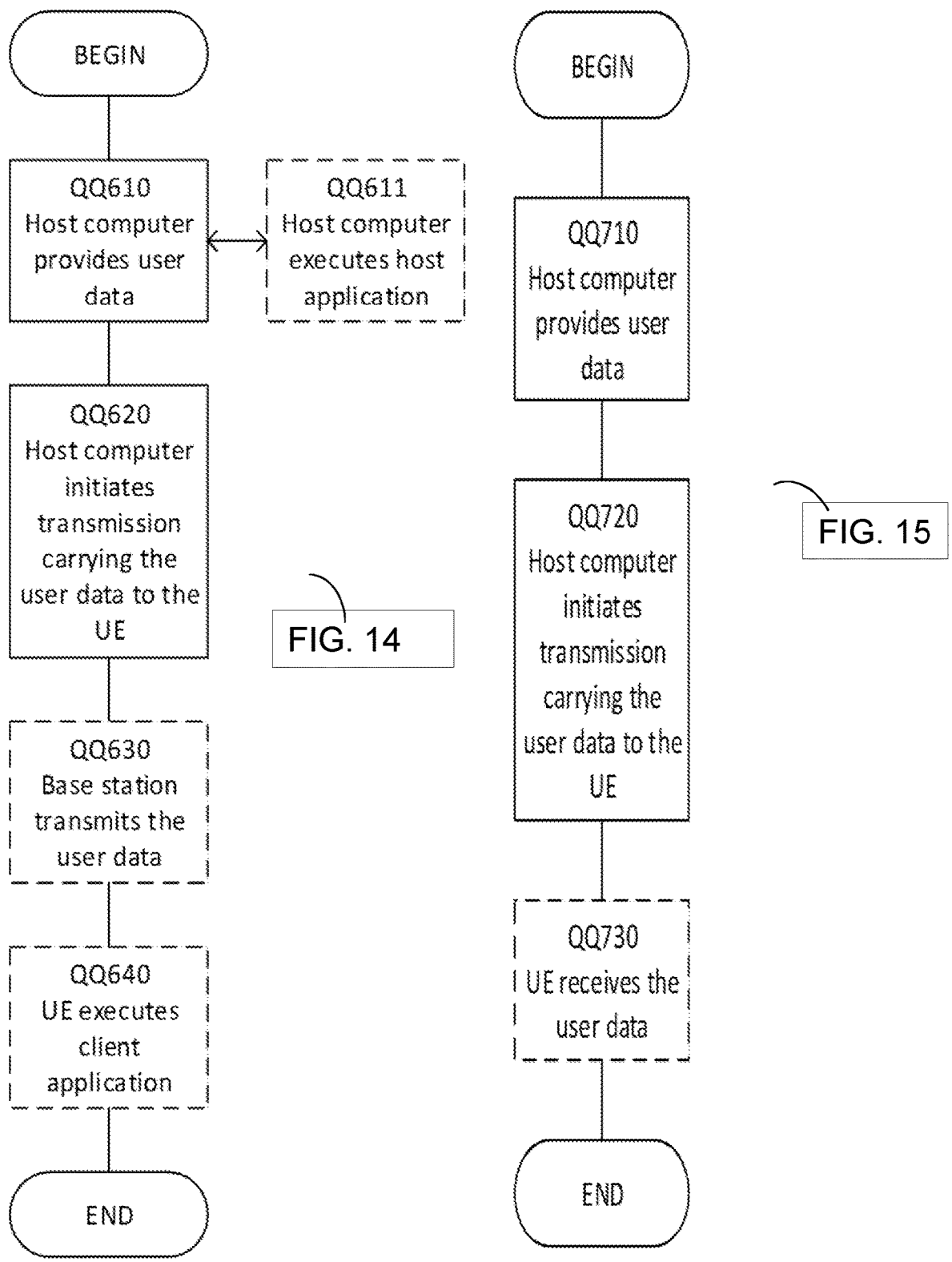

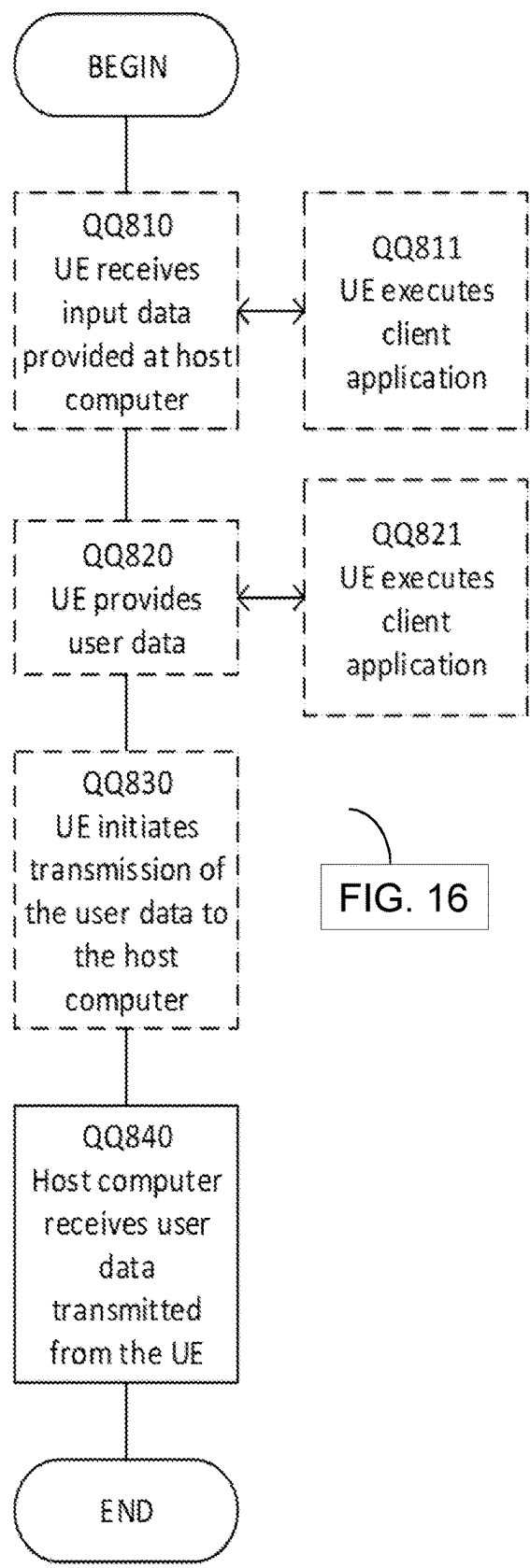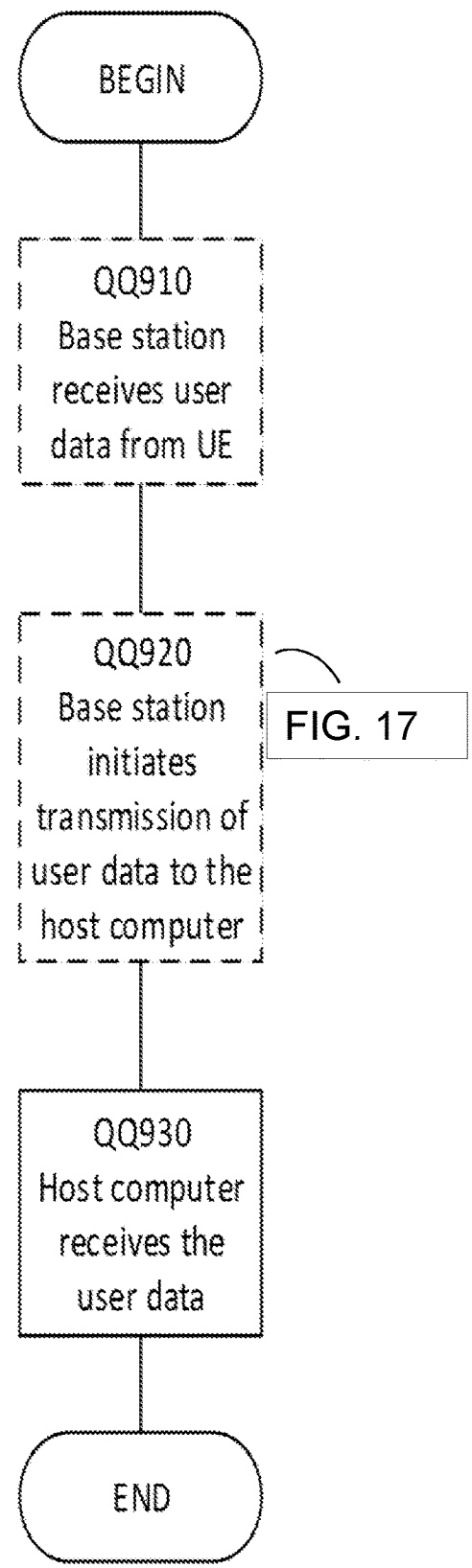

USER EQUIPMENT, RADIO NETWORK NODE AND METHODS PERFORMED THEREIN FOR HANDLING COMMUNICATION

TECHNICAL FIELD

Embodiments herein relate to a User Equipment, a radio network node and methods performed therein regarding wireless communication. In particular, embodiments herein relate to handling communication e.g. handling second cell group configuration, in a wireless communication network.

BACKGROUND

In a typical wireless communication network, user equipments (UEs), also known as wireless communication devices, mobile stations, wireless devices, stations (STA) and/or, may communicate via a Radio Access Network (RAN) to one or more core networks (CN). The RAN covers a geographical area which is divided into service areas, also known as cells, with each cell being served by a radio network node e.g., a Wi-Fi access point or a radio base station (RBS), which in some networks may also be called, for example, a NodeB, an eNodeB or a gNodeB. The cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for e.g. third generation networks, and investigate enhanced data rate and radio capacity and upcoming generation networks. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work contins in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Inter-RAT and Inter 5GC interworking in LTE and NR.

5G in 3GPP introduce both a new core network called 5GC and a new Radio Access Network (NR). The core network, 5GC, will however, also support other RATs than NR. It has been agreed that LTE (or E-UTRA) may also be connected to 5GC. LTE base stations that are connected to 5GC is called ng-eNB and is part of NG-RAN which also consist of NR base stations called gNBs. FIG. 1 shows how the base stations are connected to each other and the nodes in 5GC.

There are different ways to deploy 5G network with or without interworking with LTE (also referred to as E-UTRA) and evolved packet core (EPC). In principle, NR and LTE can be deployed without any interworking, denoted by NR stand-alone (SA) operation, that is gNB in NR can be connected to 5G core network (5GC) and eNB can be connected to EPC with no interconnection between the two, these are referred to as Option 1 and Option 2. On the other hand, the first supported version of NR is the so-called EN-DC (E-UTRAN-NR Dual Connectivity), referred to as Option 3. In such a deployment, dual connectivity between NR and LTE is applied with LTE as the master and NR as the secondary node. The RAN node (gNB) supporting NR, may not have a control plane connection to core network (EPC), instead it relies on the LTE as master node (MeNB). This is also called as "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE can also be connected to 5GC using option 5 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that, Option 4 and option 7 are other variants of dual connectivity between LTE and NR which will be standardized as part of NG-RAN connected to 5GC, denoted by Multi-Radio Dual Connectivity (MR-DC). E.g., the following is included under the MR-DC umbrella:

EN-DC (Option 3): LTE is the master node and NR is the secondary (EPC CN employed)
NE-DC (Option 4): NR is the master node and LTE is the secondary (SGCN employed)
NGEN-DC (Option 7): LTE is the master node and NR is the secondary (SGCN employed)

NR-DC (variant of Option 2): Dual connectivity where both the master and secondary are NR (SGCN employed).

As migration for these options may differ from different operators, it is possible to have deployments with multiple options in parallel in the same network e.g. there could be eNB base station supporting option 3, 5 and 7 in the same network as NR base station supporting 2 and 4. In combination with dual connectivity solutions between LTE and NR it is also possible to support Carrier Aggregation (CA) in each cell group, i.e. master cell group (MCG) and secondary cell group (SCG), and dual connectivity (DC) between nodes on same RAT, e.g. NR-NR DC. For the LTE cells, a consequence of these different deployments is the co-existence of LTE cells associated to eNBs connected to EPC, 5GC or both EPC/5GC.

Suspend/Resume in LTE and Relation to CA/SCell and SCG Additions

A very typical scenario/use case is a UE with some burst traffic that comes and goes e.g. some video packets, idle periods of transmission/reception, then comes live again. To save UE power, the network transitions the UE from connected to idle during these periods. Then, UE comes back again, either via paging or UE request to get connected, and accesses the network.

In LTE Release 13, a mechanism was introduced for the UE to be suspended by the network in a suspended state similar to RRC_IDLE but with the difference that the UE stores the Access Stratum (AS) context or radio resource control (RRC) context. This makes it possible to reduce the signaling when the UE is becoming active again by resuming the RRC connection, instead of as prior to establish the RRC connection from scratch. Reducing the signaling could have several benefits:

Reduce latency e.g. for smart phones accessing Internet
Reduced signaling leads to reduce battery consumption for machine type devices sending very little data.

The Release 13 solution is based on that the UE sends a RRCConnectionResumeRequest message to the network and in response may receive an RRCConnectionResume from the network. The RRCConnectionResume is not encrypted but integrity protected.

The resume procedure in LTE can be found in the RRC specifications (TS 36.331). As the UE performing resume is in RRC_IDLE (with suspended AS context), that triggers a transition from RRC_IDLE to RRC_CONNECTED. Hence, that is modelled in the specifications in the same sub clause that captures the RRC connection establishment (sub clause 5.3.3 RRC connection establishment in TS 36.331).

There are few things relevant to highlight in the SCG configurations and SCell configurations for MCGs in relation to suspend/resume procedures. Upon suspension, it is defined that the UE stores its used RRC configuration. In other words, if the UE is operating in any dual connectivity mode (and has a n SCG configuration) or just having configured SCells in the MCG, it shall store all these configurations. However, upon resume, at least until Release 15, it is defined that the UE shall release the SCG configurations and SCell configurations, as shown below:

5.3.3.2 Initiation
The UE initiates the procedure when upper layers request establishment or resume of an RRC connection while the UE is in RRC_IDLE or when upper layers request resume of an RRC connection or RRC layer requests resume of an RRC connection for, e.g. RNAU or reception of RAN paging while the UE is in RRC_INACTIVE.

. . .

Except for NB-IoT, upon initiating the procedure, if connected to EPC or 5GC, the UE shall:
1> if the UE is resuming an RRC connection from a suspended RRC connection or from RRC_INACTIVE:
2> if the UE is resuming an RRC connection from a suspended RRC connection:
3> if the UE was configured with EN-DC:
4> perform EN-DC release, as specified in TS 38.331 [82], clause 5.3.5.10;
2> release the MCG SCell(s), if configured, in accordance with 5.3.10.3a;
. . .
2> release the entire SCG configuration, if configured, except for the DRB configuration (as configured by drb-ToAddModListSCG);

Hence, when the UE comes from RRC_IDLE with the context, if network wants to add SCell(s) to the MCG or add an SCG, it needs to do that from scratch, even if the UE is suspending and resuming in the same cell/area where all the previous PCell and SCell configurations are still valid from a radio conditions perspective).

As the use case of UEs with burst traffic constantly being suspended and resuming in the same cell is quite typical, 3GPP has standardized a solution in LTE to enable the UE to assist the network with measurements performed while the UE is in RRC_IDLE so that the network could speed up the setup of carrier aggregation or dual connectivity. That solutions in described below.

Existing solution for early measurements upon idle to connected transition in LTE (Release 15)

In LTE Release 15, it is possible to configure the UE to report so called early measurements upon the transition from idle to connected state. These measurements are measurements that the UE can perform in idle state, and according to a configuration provided by the source cell with the intention to receive these measurements immediately after the UE gets connected and quickly setup CA and/or other forms of DC (e.g. EN-DC, MR-DC, etc.) without the need to first provide a measurement configuration (measConfig) in RRC_CONNECTED, as shown in previous sections, and wait for hundreds of milliseconds until first samples are collected, monitored and then the first reports are triggered and transmitted to the network.

Measurement configuration for early measurements upon resume in LTE

A first aspect of the existing solution, as standardized in EUTRA 36.331, is described in section 5.6.20 Idle Mode Measurements. The UE can receive these idle mode measurement configurations in the system information (SIB5) in the field MeasIdleConfigSIB-r15, indicating up to 8 cells or ranges of cell IDs to perform measurements on. In addition, the UE can be either configured upon the transition from RRC_CONNECTED to RRC_IDLE with a dedicated measurement configuration in the RRCConnectionRelease message with the measIdleDedicated-r15 which overrides the broadcasted configurations in SIB5. The broadcasted and dedicated signaling is shown below:

MeasIdleConfig field descriptions allowedMeasBandwidth
If absent, the value corresponding to the downlink bandwidth indicated by the dl-Bandwidth included in MasterInformationBlock of serving cell applies.
carrierFreq -continued

| MeasIdleConfig field descriptions |
| --- |
| Indicates the E-UTRA carrier frequency to be used for measurements during IDLE mode.<br>measIdleCarrierListEUTRA<br>Indicates the E-UTRA carriers to be measured during IDLE mode.<br>measIdleDuration<br>Indicates the duration for performing measurements during IDLE mode for measurements assigned via RRCConnectionRelease. Value sec10 correspond to 10 seconds, value sec30 to 30 seconds and so on.<br>qualityThreshold<br>Indicates the quality thresholds for reporting the measured cells for IDLE mode measurements.<br>MeasIdleConfig field descriptions<br>report Quantities<br>Indicates which measurment quantities UE is requested to report in the IDLE mode measurement report.<br>measCellList<br>Indicates the list of cells which the UE is requested to measure and report for IDLE mode measurements.<br>validityArea<br>Indicates the list of cells within which UE is requested to do IDLE mode measurements. If the UE reselects to a cell outside this list, the measurements are no longer required. |

Carrier Information and Cell List

The UE is provided with a list of carriers and optionally with a list of cells that the UE 10 shall perform measurements. The fields s-NonIntraSearch in SystemInformation-BlockType3 do not affect the UE 10 measurement procedures in IDLE mode.

Timer T331

Upon the reception of that measurement configuration, the UE 10 starts a timer T331 with the value provided in measIdleDuration, which can go from 0 to 300 seconds. The timer stops upon receiving RRCConnectionSetup, RRCConnectionResume which indicates a transition to RRC_CONNECTED. That concept exists to limit the amount of time the UE perform measurements for that purpose of early measurements.

Validity Area

Another concept introduced in the LTE Release 15 solution is a validity area, which comprises a list of PCIs. The intention is to limit the area where CA or DC may be setup later when the UE resumes/setups the connection, so the early measurements are somewhat useful for that purpose. If validityArea is configured, and UE reselects to a serving cell whose PCI does not match any entry in validityArea for the corresponding carrier frequency, the timer T331 is stopped. Then, UE stops to perform IDLE measurements and releases the configuration (i.e. VarMeasIdleConfig). Notice that this does not necessarily implies that the UE releases the idle measurements that were configured in Release and that were performed i.e. these may still be stored and possibly requested by the network. In addition, the UE may continue with IDLE mode measurements according to the broadcasted SIB5 configuration after the timer T331 has expired or stopped.

Minimum Quality Threshold

Notice also that only measurements above a certain threshold shall be stored as the cell candidates for CA setup needs to be within a minimum acceptable threshold. How the UE performs measurements in IDLE mode is up to UE implementation as long as RAN4 requirements for measurement reporting defined in 36.133 are met.

The UE behaviour in more details is shown below as captured in 36.331:
5.6.20 Idle Mode Measurements
5.6.20.1 General
This procedure specifies the measurements done by a UE in RRC_IDLE when it has an IDLE mode measurement configuration and the storage of the available measurements by a UE in both RRC_IDLE and RRC_CONNECTED.
5.6.20.2 Initiation
While T331 is running, the UE shall:
4>
5.6.20.3 T331 Expiry or Stop
The UE shall:
Notice that it is not mandatory for the source node releasing/suspending the UE to provide a dedicated idle measurement configuration for the purpose of early measurements. If the UE is released and/or suspended to idle without being provided with a list of carriers to be measured, the UE obtains that from SIB2, as written below:
And, in that case of the list not being provided in RRCConnectionRelease, at every cell reselection the UE performs the SIB5 acquisition to possibly update its list of carriers to measure as shown below:
5.2.2.12 Actions Upon Reception of SystemInformation-BlockType5
If the UE enters a cell within the validity area that is not broadcasting the measurement configuration in SIB5, the UE continues to perform idle measurements according to the SIUB5 acquired in the source cell (i.e. the cell the UE was suspended or released).
RRC_INACTIVE in NR in LTE Release 15
As part of the standardized work on 5G NR in 3GPP it has been decided that NR should support an RRC_INACTIVE state with similar properties as the suspended state in LTE Release 13. The RRC_INACTIVE has slightly different properties from the late state in that it is a separate RRC state and not part of RRC_IDLE as in LTE. Additionally the CN/RAN connection (NG or N2 interface) is kept for RRC_INACTIVE while it was suspended in LTE. FIG. 2 is showing possible state transitions between in NR. The properties of the states above is as follows:
RRC_IDLE:
A UE specific DRX may be configured by upper layers;
UE controlled mobility based on network configuration;
The UE:
Monitors a Paging channel for CN paging using 5G-S-TMSI;
Performs neighbouring cell measurements and cell (re-)selection;
Acquires system information.
RRC_INACTIVE:
A UE specific DRX may be configured by upper layers or by RRC layer;
UE controlled mobility based on network configuration;
The UE stores the AS context;
The UE:
Monitors a Paging channel for CN paging using 5G-S-TMSI and RAN paging using I-RNTI;
Performs neighbouring cell measurements and cell (re-)selection;
Performs RAN-based notification area updates periodically and when moving outside the RAN-based notification area;
Acquires system information.
RRC_CONNECTED:
The UE stores the AS context.
Transfer of unicast data to/from UE.

At lower layers, the UE may be configured with a UE specific DRX.;

For UEs supporting CA, use of one or more SCells, aggregated with the SpCell, for increased bandwidth;

For UEs supporting DC, use of one SCG, aggregated with the MCG, for increased bandwidth;

Network controlled mobility, i.e. handover within NR and to/from E-UTRAN.

The UE:

Monitors a Paging channel;

Monitors control channels associated with the shared data channel to determine if data is scheduled for it;

Provides channel quality and feedback information;

Performs neighbouring cell measurements and measurement reporting;

Acquires system information.

SUMMARY

An object herein is to provide a mechanism to in an efficient manner enable communication in a wireless communication network.

According to an aspect the object is achieved, according to embodiments herein, by providing a method performed by a UE for receiving configuration data in a wireless communication network.

The UE receives configuration data from a network node for configuring the UE with early measurement configuration, which the UE will use to perform measurements in dormant state. The UE is further configured with one or more SCG configuration(s) that are to be stored by the UE and/or the radio network node while the UE is in dormant state.

The UE measures, in a dormant state according to the early measurement configuration for one or more configured SCG configurations, and upon transition to a connected mode the UE compares the measurement to one or more trigger conditions associated with the one or more SCG configurations.

According to another aspect the object is achieved, according to embodiments herein, by providing a method performed by a radio network node for enabling or handling communication of a UE in a wireless communication network. The radio network node is serving the UE. The radio network node configures, e.g. transmits configuration data, the UE with early measurement configuration, which the UE uses to perform measurements in dormant state. The radio network node further configures, e.g. transmits configuration data, the UE with one or more SCG configuration(s) that are stored by the UE and/or the radio network node while the UE is in dormant state. The radio network node may further configure, e.g. transmits configuration data, the UE with one or more trigger conditions, associated with the one or more SCG configurations.

It is furthermore provided herein a computer program product comprising instructions, which, when executed on at least one processor, cause the at least one processor to carry out any of the methods above, as performed by the user equipment or the radio network node. It is additionally provided herein a computer-readable storage medium, having stored there on a computer program product comprising instructions which, when executed on at least one processor, cause the at least one processor to carry out the method according to any of the methods above, as performed by the radio network node or the user equipment.

According to embodiments herein a user equipment and a radio network node are also herein provided configured to perform the methods herein.

An advantage of embodiments herein is that the UE can achieve a fast SCG addition procedure without the need to report early idle/inactive measurements to a radio network node to only then be able to receive an SCG addition configuration. The method also has more reliability than blind configuration (e.g. resuming the SCG configuration used just before suspension) by the network without considering the current radio conditions.

BRIEF DESCRIPTION OF THE DRAWINGS

Embodiments will now be described in more detail in relation to the enclosed drawings, in which:

FIG. 14 shows methods implemented in a communication system including a host computer, a base station and a user equipment in accordance with some embodiments;

FIG. 15 shows methods implemented in a communication system including a host computer, a base station and a user equipment in accordance with some embodiments;

FIG. 16 shows methods implemented in a communication system including a host computer, a base station and a user equipment in accordance with some embodiments; and FIG. 17 shows methods implemented in a communication system including a host computer, a base station and a user equipment in accordance with some embodiments.

DETAILED DESCRIPTION

Figure 1:
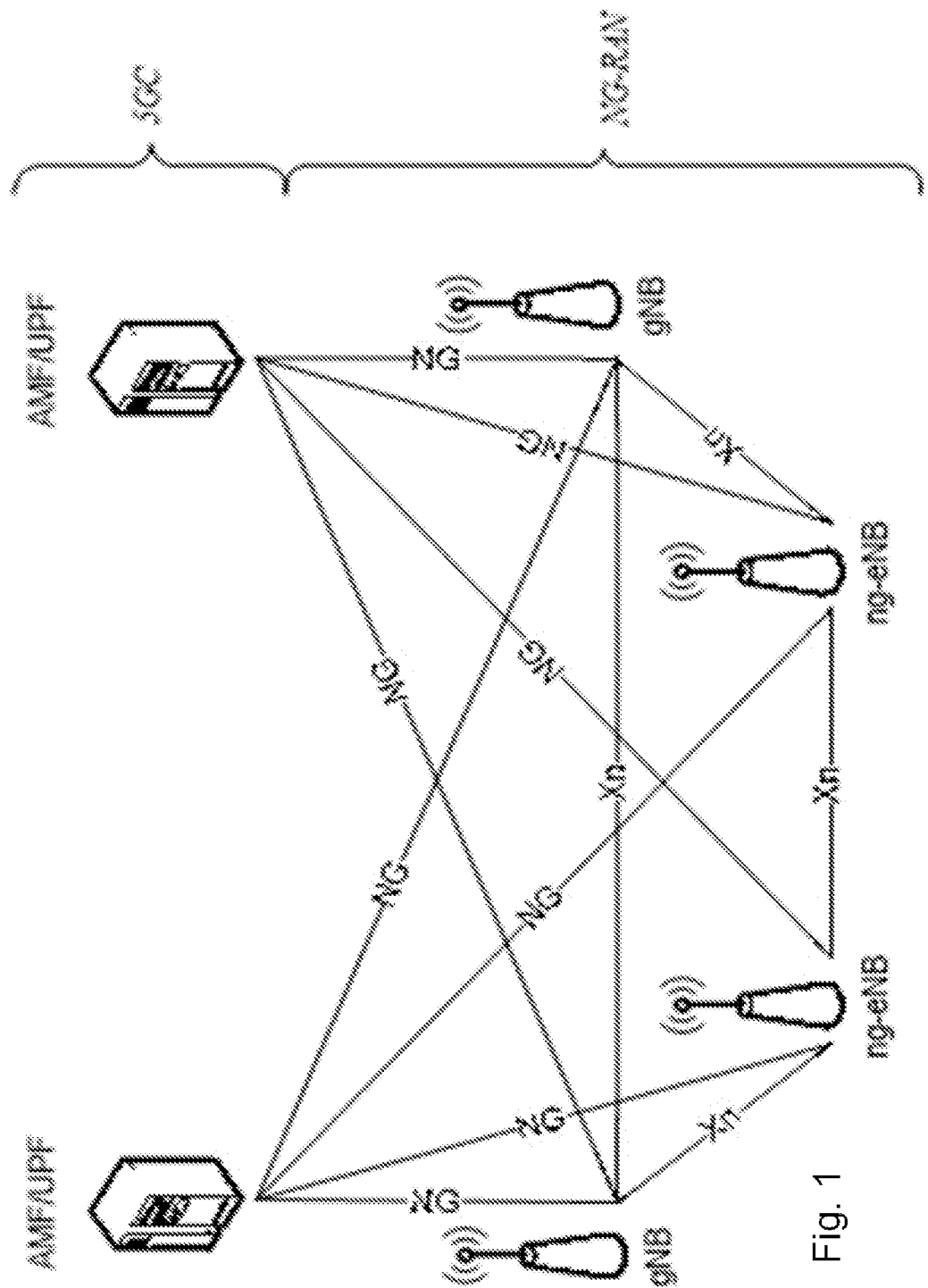
FIG. 1 shows a 5GS Architecture containing 5GC and NG-RAN.
Figure 2:
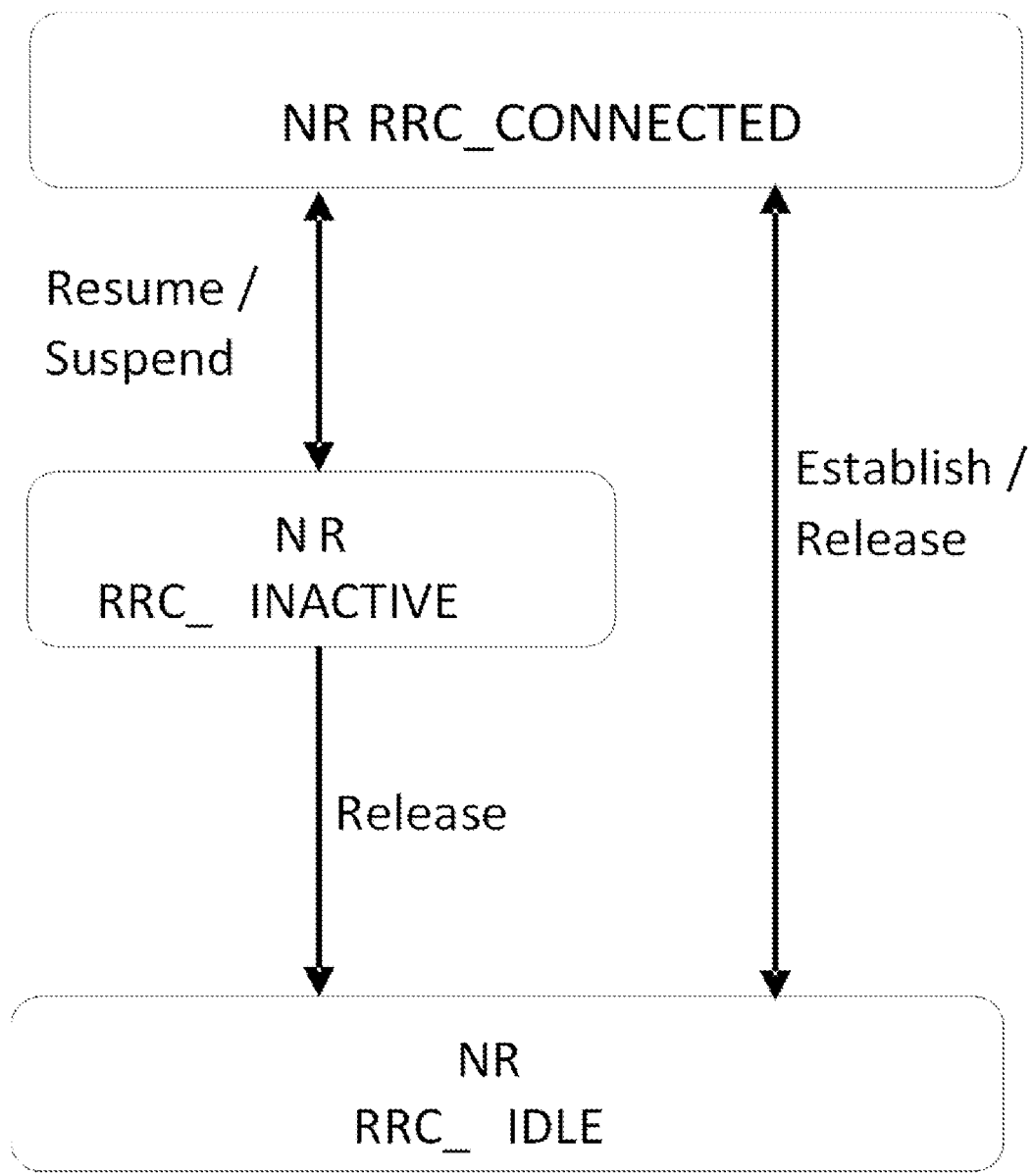
FIG. 2 shows UE state machine and state transitions in NR.

As part of developing embodiments herein, a problem was identified which first will be discussed.

Introducing of early measurements upon idle/inactive to connected transition in NR (Release 16)

A work item has been approved in Release 16 to enhance the setup of CA/DC in NR. The "DC and CA enhancements"

was approved in RAN #80 in RP-181469, and updated in RAN #81 in RP-182076 and, one of the objectives is the following:

Early Measurement reporting: Early and fast reporting of measurements information availability from neighbor and serving cells to reduce delay setting up MR-DC and/or CA. [RAN2, RAN4]
This objective applies to MR-DC, NR-NR DC and CA.
The objective should consider measurements in IDLE, INACTIVE mode and CONNECTED mode.
The impacts on UE power consumption should be minimized.
The LTE Release 15 Enhancing LTE CA Utilization (euC). A work should be utilized, when applicable.

Hence, 3GPP is going to investigate solutions to enable early measurements performed when the UE is in RRC_INACTIVE or RRC_IDLE state and, reporting mechanisms for when the UE enters RRC_CONNECTED.

Three different kinds of solutions are being considered for resuming a connection from dormant state in Release 16 (both for LTE and NR):
1/UE reports early measurements in UEInformationResponse after request from network in UEInformationRequest transmitted after the UE sends an RRCResumeComplete/RRCConnectionResumeComplete or, after security is activated when UE comes from idle without stored context;
2/UE reports early measurements with (e.g. multiplexed with or as part of the message) RRCResumeComplete/RRCConnectionResumeComplete/RRCSetupComplete/RRCConnectionSetupComplete/SecurityModeComplete;
3/UE reports early measurements with (e.g. multiplexed with or as part of the message) RRCResumeRequest/RRCConnectionResumeRequest/RRCSetupRequest/R RCConnectionSetupRequest/;

There are some differences in details of each of these solutions, and not all of them may be applicable for RRC_IDLE in the same way they are for RRC_INACTIVE. However, in any of these solutions for the reporting, the UE relies on a measurement configuration, which may be provided with dedicated signaling when the UE is suspended to RRC_INACTIVE or when the UE is released to RRC_IDLE. The measurement configuration could also be provided in broadcast signaling (e.g. SIB5) instead of dedicated signaling. The measurement configuration indicates how the UE shall perform these measurements while in IDLE/INACTIVE, to be reported when the UE resumes (in the case of coming from RRC_INACTIVE) or setups up a connection (in the case of coming from RRC_IDLE). And, in all of these solutions, the UE transmits a measurement report to the network upon the transition from IDLE/INACTIVE to CONNECTED.

Suspend/Resume of SCG Configurations

The same work item (approved in RAN #80 in RP-181469, and updated in RAN #81 in RP-182076), also has the following objective:

Efficient and low latency serving cell configuration/activation/setup: Minimizing signalling overhead and latency needed for initial cell setup, additional cell setup and additional cell activation for data transmission. [RAN2, RAN1, RAN4, RAN3]
This objective applies to MR-DC, NR-NR DC and CA
The objective should consider enhancements when starting from IDLE, INACTIVE mode and CONNECTED mode This working item objective includes configuring and/or restoring SCG configurations in RRC Resume, and it was agreed during RAN2 #105 that:
Agreements
SCG Configuration in RRC Resume (RRCRe).

In a previous solution, several mechanisms to handle multiple SCG configurations have been disclosed, including adding SCG configurations, remove SCG configurations during inactive/idle to active/connected state transition or during active/connected state.

However, when it comes to how the resuming of a particular SCG configuration, only network based (i.e. MN or SN triggered) mechanisms were discussed. Relying only on network triggered mechanisms implies that measurements have to be sent by the UE to the network, and network has to reconfigure the UE before the proper SCG is resumed or configured or network needs to perform these actions blindly. This can lead to delays and embodiments herein propose several mechanisms to address that.

Recently, in another of ours solutions, a method has been proposed consisting of configuring an RRC_CONNECTED UE with a conditional reconfiguration for SCG addition (e.g. with the content equivalent to an RRCReconfiguration message used for the addition of an SCG, i.e., containing a secondary cell group configuration)+a trigger condition configuration (e.g. like an A4 event configuration, neighbour becomes better than threshold).

As described above, the trigger condition configuration may be like an A4 event configuration as defined in reporting configuration (field reportConfig of IE ReportConfigNR). In existing network, A4 event may be configured by the network for measurement reporting i.e. when an A4 event is triggered (a neighbour cell in a frequency provided in the configuration becomes better than a configured threshold) the UE transmits a measurement reporting. In the case of conditional SCG addition, the triggering of an A4 event leads to the UE applying the stored RRCReconfiguration containing the secondary cell group configuration.

Figure 3:
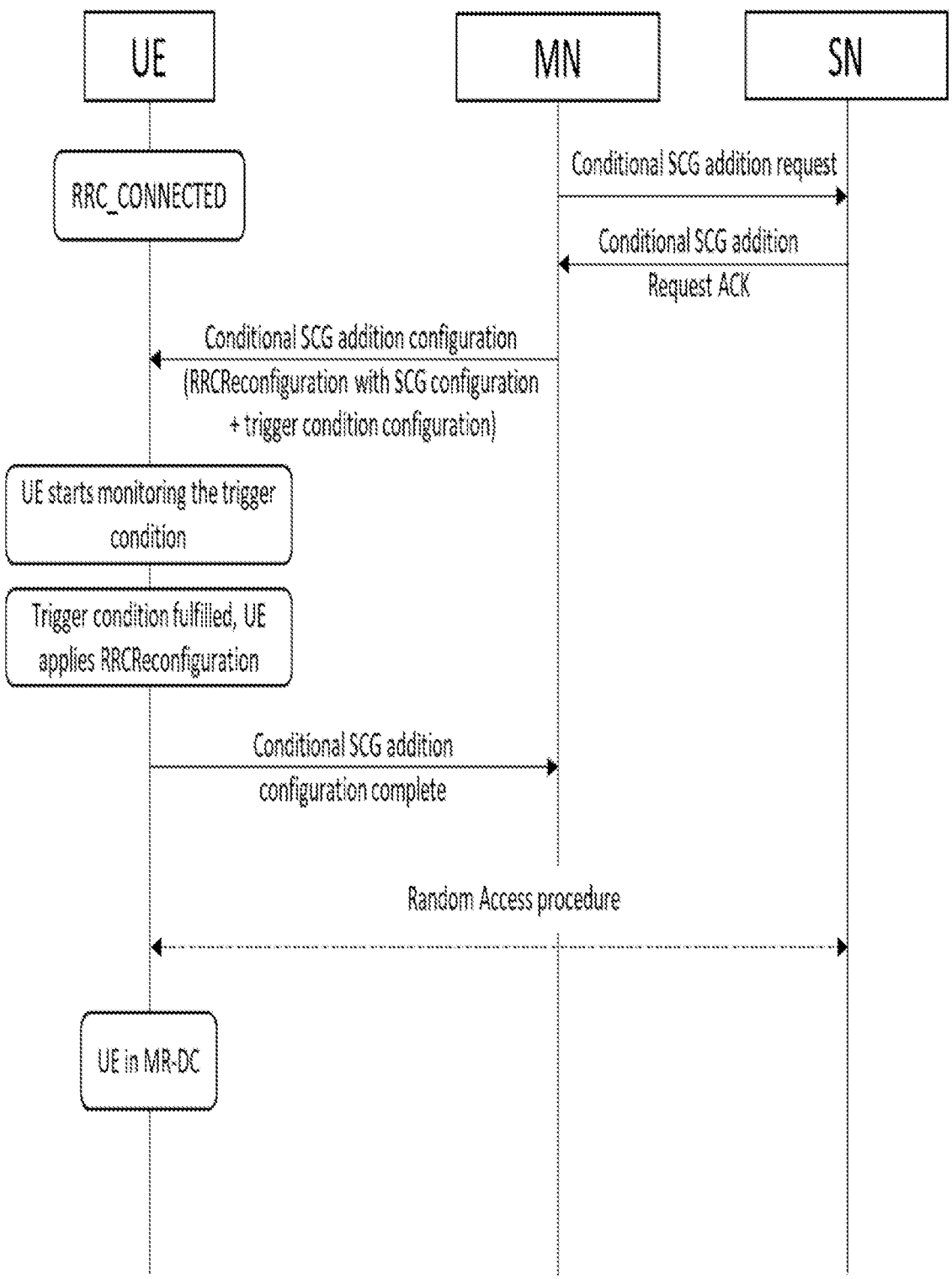
FIG. 3 shows a signalling scheme according to a previous solution.

A main scenario where that occurs is when the UE is in RRC_CONNECTED, it receives the conditional SCG addition configuration containing the RRCReconfiguration with a secondary cell group configuration and the trigger condition configuration, possibly in an RRCConditionalReconfiguration-like message. See FIG. 3.

Details concerning the possibility to configure several SCG configuration as well as measurement/trigger conditions for resuming a particular SCG configuration when the trigger conditions are fulfilled have been disclosed. A solution was inspired by the conditional handover solution, where the UE can receive a trigger condition configuration and monitors if the condition is fulfilled based on measurements on the primary cell (PCell) and neighbour cells on a given frequency. In the case of conditional SCG, one could assume that upon receiving the conditional SCG addition configuration with the RRCReconfiguration+the trigger condition configuration, the UE starts to monitor the trigger conditions based on measurements that have been configured (i.e. measConfig provided in RRCResume or RRCReconfiguration) and/or measurements according to the trigger condition configuration.

A solution has been disclosed addressing only operations in RRC_CONNECTED mode (i.e. the UE has at least an active connection with the master node (MN), while the SCG may have been suspended or not added at all). Herein, the case that is handled is when the UE is in a dormant state also referred to as a power saving mode, e.g. RRC_INACTIVE RRC_IDLE, RRC_IDLE with suspended, etc., and how the measurements performed in the power saving mode can be used to trigger SCG addition/resumption upon transition to CONNECTED mode e.g. active mode.

It should be noted that the wordings "connected mode" and "connected state" when used herein have the same meaning and therefore may be used interchangeable.

Embodiments herein propose methods to enable an efficient resumption or addition of SCG when the UE is transitioning from a dormant state to a connected state, or in other words from a power saving mode to a non-power saving mode. This is enabled by:

- Configuring the UE with early measurement configuration, which the UE uses to perform measurements in dormant state
- Configuring the UE with (multiple) SCG configuration(s) that are stored by the UE/network while the UE is in dormant state
- Configuring trigger conditions, associated with the SCG configurations
  - Upon resuming, the UE checks if the trigger conditions are fulfilled
- If so, the UE applies/restores the associated SCG configuration, and possibly inform the radio network node or another radio network node about the SCG configuration that fulfilled the trigger condition
- Else, it will release the SCG configurations or keep them stored (depending on configuration by radio network node or some standardized behavior).

An advantage of embodiments herein is that the UE can achieve a fast SCG addition procedure without the need to report early idle/inactive measurements to a radio network node to only then be able to receive an SCG addition configuration. The method also has more reliability than blind configuration (e.g. resuming the SCG configuration used just before suspension) by the network without considering the current radio conditions.

Compared to the early measurement reporting solutions being discussed for LTE/NR Release 16 and LTE Release 15 CA solutions, embodiments herein have the advantage of making use of the measurement results without the need for the UE to report them to the network. That is, the proposed method has an advantage even compared to a msg3 based solution that makes the measurement results available at the network before the network sends any one out of a RRC Resume message (RRCResume) and a RRC Connection Resume message (RRCConnectionResume) during connection resumption, or any one out of a first RRC Reconfiguration message (RRCReconfiguration) and a RRC Connection Reconfiguration message, (RCConnectionReconfiguration) during connection establishment. This is because no additional UL grants are needed for sending the measurements and no additional DL grants are need for sending the SCG configurations in the resume/reconfiguration message since the SCG configurations may be already available at the UE according to some of the embodiments.

Figure 4:
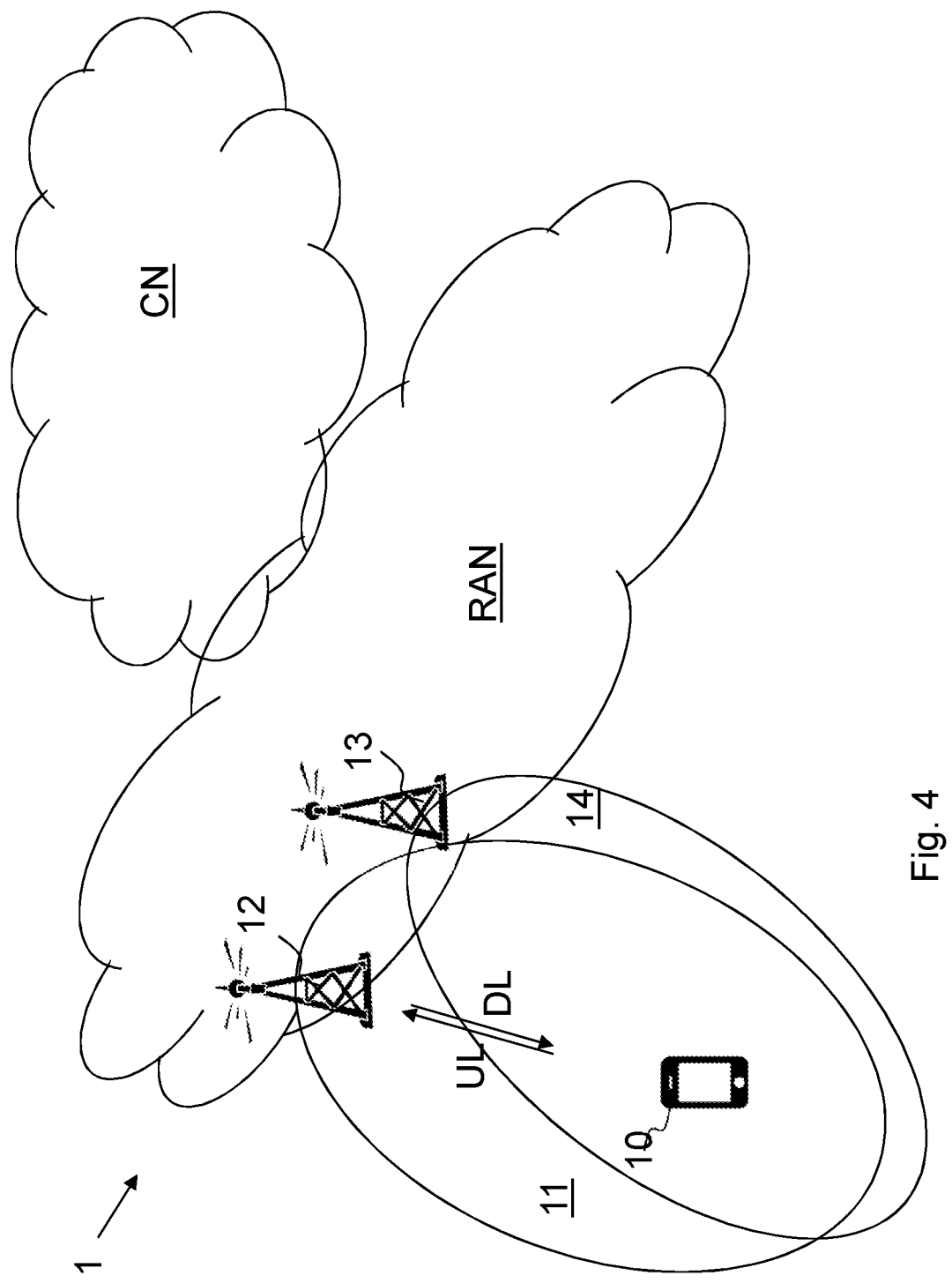
FIG. 4 is a schematic overview depicting a wireless communication network according to embodiments herein.

Embodiments herein relate to wireless communication networks in general. FIG. 4 is a schematic overview depicting a wireless communication network 1. The wireless communication network 1 comprises one or more RANs and one or more CNs. The wireless communication network 1 may use one or a number of different technologies. Embodiments herein relate to recent technology trends that are of particular interest in a 5G context; however, embodiments are also applicable in further development of existing wireless communication systems such as e.g. LTE and Wideband Code Division Multiple Access (WCDMA).

In the wireless communication network 1, wireless devices configured to communicate with the RAN or with one another over a side link e.g. a UE 10, such as a communication device. It should be understood by the skilled in the art that "UE 10" is a non-limiting term which means any terminal, wireless communication terminal, wireless device, narrowband-internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node or a wireless device.

The wireless communication network 1 comprises a radio network node 12 providing radio coverage over a geographical area, a service area 11, of a first radio access technology (RAT), such as NR, LTE or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node 12 depending e.g. on the first radio access technology and terminology used. The radio network node 12 may be referred to as a serving radio network node wherein the service area may be referred to as a serving cell, and the serving network node communicates with the UEs in form of DL transmissions to the UEs and UL transmissions from the UEs. It should be noted that a service area may be denoted as cell, beam, beam group or similar to define an area of radio coverage. The radio network node may be serving a cell of a master cell group for the UE 10.

The wireless communication network 1 may further comprise a second radio network node 13 providing radio coverage over a geographical area, a second service area 14, of a second radio access technology (RAT), such as NR, LTE or similar. The second radio network node 13 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a secondary serving radio network node wherein the service area may be referred to as a secondary serving cell, and the secondary serving radio network node communicates with the UEs in form of DL transmissions to the UEs and UL transmissions from the UEs. It should be noted that a service area may be denoted as cell, beam, beam group or similar to define an area of radio coverage. The second radio network node 13 may be serving a cell of a secondary cell group for the UE 10.

Embodiments herein may apply to cases where the UE 10 is in dormant state in LTE and NR (LTE/NR IDLE, LTE IDLE with suspended, eLTE/NR INACTIVE).

The SCG configuration may also apply to LTE or NR SCG configuration (e.g. EN-DC, NR-DC, NE-DC, NGEN-DC, LTE-DC, . . . )

Embodiments herein may be concerned with a case where the UE 10 resumes in the same node and/or cell as it was suspended. However, most of the embodiments, apart from security key considerations, are applicable to a case where the UE 10 resumes in a different node and/or cell than where it was suspended.

For the sake of brevity,
- most of the methods use the NR terminology (but the methods are equally applicable to LTE with the corresponding LTE messages/procedures, e.g. RRCConnectionResume instead of RRCResume), and
- most of the description is focusing on the resuming from IDLE with suspended config (LTE) and eLTE/NR INACTIVE (i.e. RRC Resume procedures in LTE and NR). However, the methods are mostly applicable to the IDLE to CONNECTED transition case as well (i.e. RRC Connection establishment procedure, and thus RRCConnectionSetup/RRCSetup handling).

Figure 5:
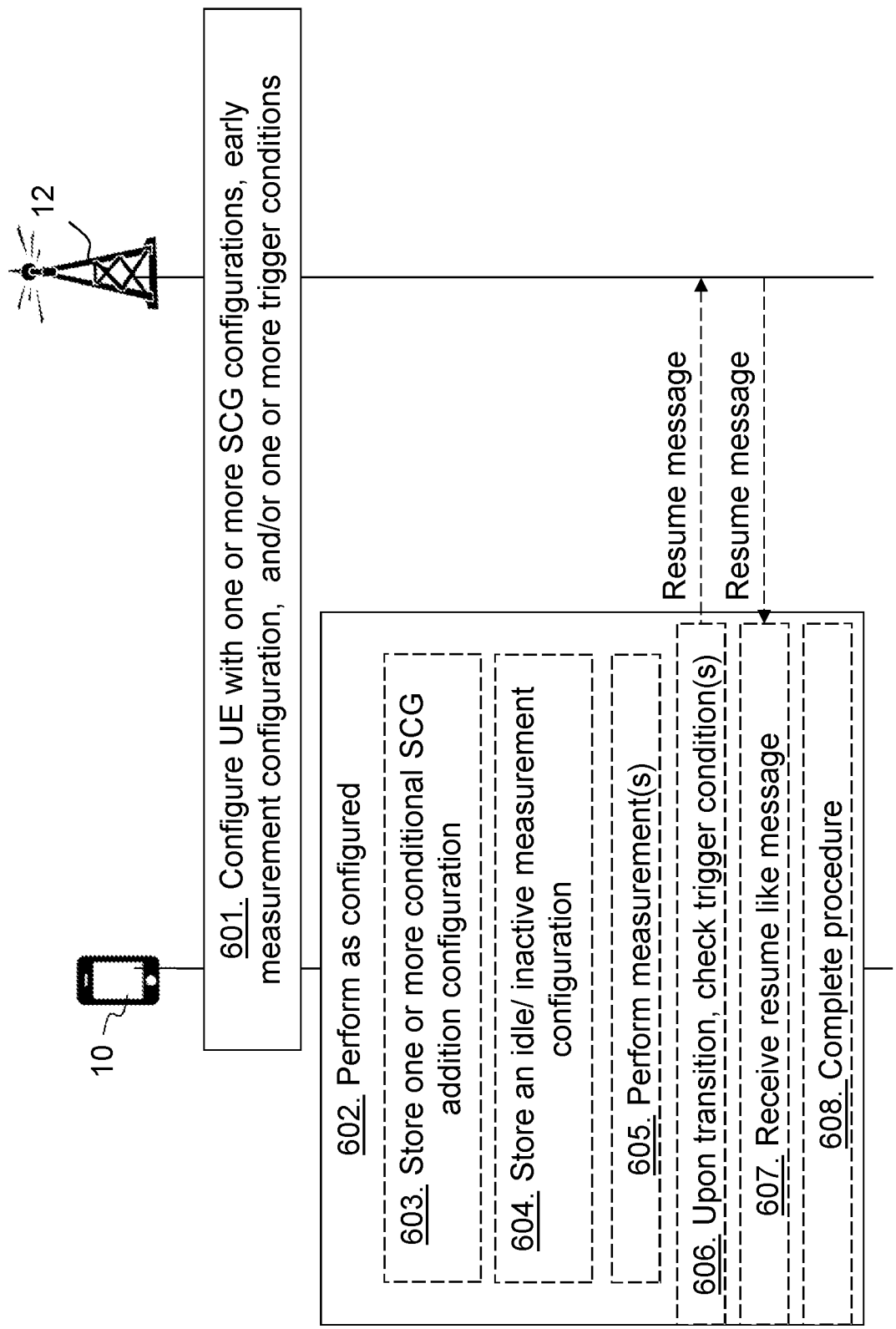
FIG. 5 shows a combined flowchart and signalling scheme according to embodiments herein.
Figure 6:
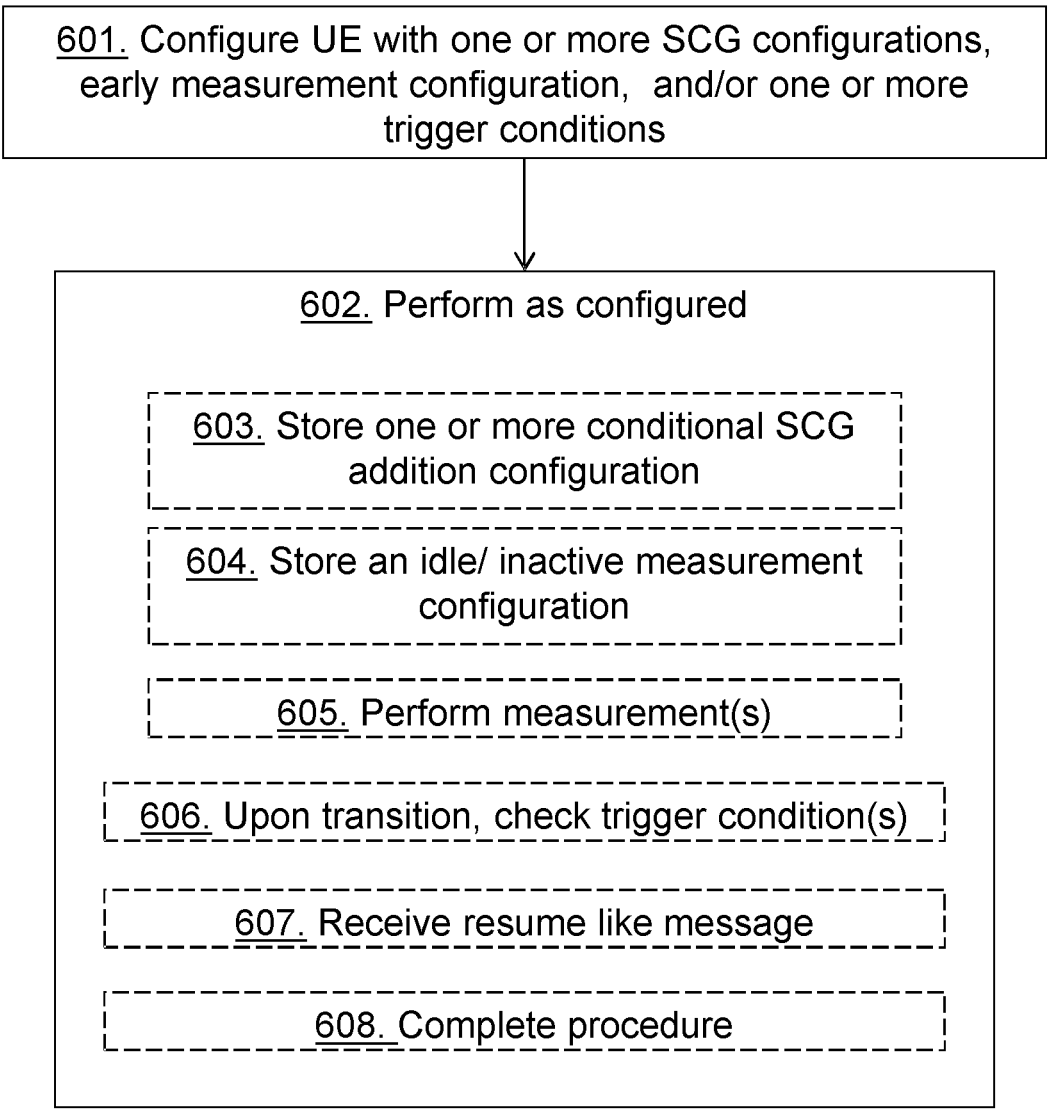
FIG. 6 is a flowchart depicting embodiments of a method performed in a UE.

The SCG configurations mentioned herein may comprise any configuration associated to the secondary cell group and/or the second radio network node also referred to as secondary node (SN), i.e. any configuration prepared by the SN and/or SN-central unit (CU)/SN-distributed unit (DU). These configurations can be contained in a reconfiguration message such as an RRCReconfiguration and/or RRCConnectionReconfiguration and/or RRCResume and/or RRCConnectionResume message comprising, one or more of the following:

- Cell Group Configuration (CellGroupConfig): e.g. physical (PHY) and/or medium access control (MAC) and/or radio link control (RLC) configurations and associated logical channel identifiers
- Radio Bearer Configuration (RadioBearerConfig): e.g. PDCP/SDAP configuration and associated radio bearer identifiers
- MeasConfig: i.e. measurements associated to the SCG.
- Security configurations, e.g. sk-Counter and security algorithms FIG. 5 is a combined signalling scheme and flowchart according to embodiments herein. The radio network node 12 is configured to serve UEs in the first cell and configure these with one or more SCG configurations. It should be noted that corresponding actions performed in the UE 10 are depicted in the flowchart of FIG. 6.

Action 601

The UE 10 receives configuration data to configure the UE 10 with an early measurement configuration, which the UE 10 will use to perform measurements in dormant state.

The UE 10 further receives configuration data to configure the UE 10 with one or more SCG configurations that are to be stored by the UE 10 and/or the radio network node 12 while the UE 10 is in dormant state.

In some embodiments, configuring the UE 10 further comprises: Configuring the UE 10 with one or more trigger conditions, associated with the one or more SCG configurations. If the trigger conditions are fulfilled, applying the associated SCG configuration. Else, the UE 10 may perform any one out of: Release the SCG configurations, or keep the SCG configurations stored.

The configuring of the UE 10 may be performed by receiving configuration data from a network node 12.

The receiving configuration data may further comprise receiving secondary key counter (sk-Counter) to be used to derive secondary keys associated to Secondary Nodes (SNs) upon resumption. The received sk-Counter may comprise a separate sk-Counter for each one of the configured SCG configurations.

In some embodiments of Action 601, the radio network node 12 configures the UE 10 with one or more of the following:

Configuring the UE 10 with early measurement configuration, which the UE 10 uses to perform measurements in dormant state.

Configuring the UE 10 with (multiple) SCG configuration(s) that are stored by the UE 10/network while the UE 10 is in dormant state.

Configuring trigger conditions associated with the SCG configurations.

Action 602

The UE 10 may then perform as configured (e.g. for fast addition of an SCG) upon transitioning from dormant/power-saving state to CONNECTED state e.g. active state.

Action 603

(First step) The UE 10 may receive and store one or more conditional SCG addition configurations containing i) a secondary cell group configuration and/or ii) a trigger condition configuration, e.g. like an A4 event configuration as defined in ReportConfigNR;

Receiving the conditional SCG addition configuration, e.g. according to any of the options below:

Option 1a: while in CONNECTED state, e.g. via RRCReconfiguration or in a new message like RRCConditionalReconfiguration; and/or Option 1b: during the transition to a power saving state (e.g. IDLE without stored context, IDLE with stored context, INACTIVE, etc. via e.g. RRCRelease); and/or Option 1c: if UE 10 is configured with an SCG while in CONNECTED state, the UE 10 receives e.g. in CONNECTED state or during transition to a power saving state (e.g. IDLE without stored context, IDLE with stored context, INACTIVE, etc., via e.g. RRCRelease) an indication to treat current SCG configurations as a conditional SCG addition configuration; and/or Option 1d: during the transition from a power saving state to a CONNECTED state (e.g. RRCResume)

The UE 10 may receive a sk-Counter as part of the conditional SCG configurations message, to be used to derive secondary keys (sk) associated to the SNs upon resumption.

Additionally or alternatively, the UE 10 may receive a separate sk-Counter for each configured SCG configurations.

The UE 10 may further receive one or more the trigger conditions or trigger configurations, e.g. according to any of the options below:

Option 2a: while in CONNECTED state (e.g. via RRCReconfiguration); and/or

Option 2b: during the transition to a power saving state (e.g. via RRCRelease); and/or Option 2c: during the transition from a power saving state to a CONNECTED state (e.g. RRCResume)

Option 2d: via a system broadcast or paging prior/during the transition from a power saving state to a CONNECTED state.

Action 604

(Second step) The UE 10 may further receive and store an idle/inactive measurement configuration to be used in a power saving state (e.g. IDLE without stored context, IDLE with stored context, INACTIVE, etc.) e.g. according to any of the options below:
  Option 1: receiving the idle/inactive measurement configuration while in CONNECTED state (e.g. via RRCReconfiguration or in a new message like RRC-ConditionalReconfiguration);
  Option 2: receiving the idle/inactive measurement configuration during the transition to a power saving state (e.g. IDLE without stored context, IDLE with stored context, INACTIVE, etc., via RRCRelease).
  Option 3: receiving the idle/inactive measurement configuration while in a power saving state (e.g. IDLE without stored context, IDLE with stored context, INACTIVE, etc., via system information broadcast).

Action 605

The UE 10 performs early measurements in a dormant state according to the early measurement configuration. The measurement results may be used without the need to report them to the wireless communication network 1.
  (Third step) The UE 10, may e.g. upon entering the power saving state (e.g. IDLE without stored context, IDLE with stored context, INACTIVE, etc.), e.g., after receiving an RRC Release like message (with or without a suspendConfig), start performing measurements according to the received/stored idle/inactive measurement configuration and may store these idle/inactive measurement results;

Action 606

Upon transition to a connected mode, the UE 10 compares the early measurements to one or more trigger conditions associated with the one or more SCG configurations.

In some embodiments, the comparing of the measurement to one or more trigger conditions associated with the one or more SCG configurations may comprise checking if the trigger conditions are fulfilled for the one or more SCG configurations. And if the trigger conditions are fulfilled, the UE 10 may apply the associated SCG configuration. Else, the UE 10 may perform any one out of: Release the SCG configurations, or keep the SCG configurations stored.

In case more than one SCG configurations satisfies the trigger condition associated with them, selecting any one out of:
  The SCG configuration that has the best radio conditions; or
  the SCG configuration which exceeds its trigger condition the most; or
  the SCG configuration with the highest priority or
  the first SCG configuration it finds that fulfills the trigger condition.

The performing of the early measurements in a dormant state according to the early measurement configuration may be performed for one or more configured SCG configurations.
  (Fourth Step) Upon triggering the resume procedure i.e. upon transition to connected state, the UE 10 may derive a new master key (KgNB/KeNB) based on the stored key, and a parameter received in RRC Release like message (the Next-hop Chaining Count, NCC). The UE 10 may also calculate the secondary key (S-KgNB/S-KeNB) for each stored SCG configuration based on the master key and the sk-Counter associated with each stored SCG configuration. The UE 10 may send an RRCResumeRequest like message to the network such as the radio network node 12.
  (Fourth Step-alternate), Upon triggering the resume procedure, the UE 10 may calculate the master key (KgNB/KeNB) based on the stored key, and a parameter received in RRC Release like message (the Next-hop Chaining Count, NCC). It uses available stored idle/inactive measurements, e.g. obtained as described in the third step, and trigger condition configuration, e.g. as described in the first step:
    the UE 10 checks if the one or more trigger conditions for the concerned SCG(s) is (are) fulfilled (for all the SCG configuration that are part of the UE 10's context)
    In case more than one SCG satisfies the trigger condition associated with them, the UE 10 may:
      select the one that has the best radio conditions; or
      select the one which exceeds its trigger condition the most; or
      select the one with the highest priority (e.g. the first one in the list); or
      select the first one it finds, which fulfills the condition;
    If any SCG was selected according to the above:
      The UE 10 indicates the chosen SCG (e.g. SCG ID) to the network such as the radio network node 12 (e.g. in RRCResumeRequest). If only one conditional SCG configuration was available/configurable, the UE 10 may set a flag in the ResumeRequest indicating that the SCG has been selected.

Action 607

(Fifth Step). The UE 10 may then receive an RRC Resume like message that may contain, in addition to a possible trigger condition configuration as discussed in step 1 above, different indications:
  i) indication to perform the addition of a specific SCG on resume (e.g. indicate the SCG, e.g. the SCG ID, that the UE 10 should add if the trigger conditions for this SCG is fulfilled); or
  ii) indication to perform SCG addition that contains a list of SCGs that may be added (e.g. network such as the radio network node 12 has prepared three SCGs, and indicates this, and UE 10 will choose the best one to add based on early measurements and trigger conditions); or
  iii) indication to perform SCG addition without an indication of any SCG that may be added (e.g. it is completely up to the UE 10 to choose an SCG to add based on early measurements and trigger conditions and network such as the radio network node 12 has to later prepare the chosen SCG by the UE 10); or
  iv) indication to not perform SCG addition on resume; or
  v) indication to (partially or completely) release the conditional SCG configuration stored at the UE 10;
There may also be a default option (e.g. UE 10 performs action i) if no indication is provided in the RRC Resume like message.
  (Fifth Step—alternate) This corresponds to the UE 10's fourth step-alternative. The UE 10 may receive an RRC Resume like message that may contain an indication if the SCG that the UE 10 has indicated in Fourth-step-alternate was resumed properly.
    If the sk-counter was provided in the resume message, the UE 10 may calculate the secondary key (S-KgNB/S-KeNB) for the selected SCG configuration based on the master key and the sk-Counter associated with the chosen SCG configuration.
    the UE 10 may then apply the corresponding SCG configuration
      In one variant, the UE 10 applies and resumes the selected SCG configurations as part of step four-alternative, but waits until it has received the RRCResume message to perform the random access.

the UE 10 may then send an RRCResumeComplete message to the network such as the radio network node 12.

the UE 10 may further start a random access procedure with the selected SN.

Action 608

The procedure ends (Sixth Step): The UE 10 may then use available stored idle/inactive measurements (e.g. obtained as described in the third step) and any additional indication in the received RRCResume message (e.g. as described in fifth step) and trigger condition configuration (e.g. as described in the first step);

If indication iv) was received in the RRCResume like message:
  The UE 10 doesn't apply the SCG configuration.
  The UE 10 keeps the SCG configurations stored and start to monitor trigger conditions based on connected mode measurements, possibly configured or resumed upon the reception of an RRCResume message (or subsequent RRCReconfiguration message);

Else if indication v) was received in the RRCResume like message:
  the UE 10 deletes all (or the indicated) stored SCG configurations;
  the UE 10 keeps the remaining SCG configurations stored, if any (i.e. it was a partial SCG deletion) and start to monitor trigger conditions based on connected mode measurements, possibly configured or resumed upon the reception of an RRCResume message (or subsequent RRCReconfiguration message);

else (i.e. indication i, ii, or iii were received in the RRCResume like message):
  The UE 10 checks if the trigger condition for the concerned SCG(s) is (are) fulfilled (i.e. in case of indication i, for only the indicated SCG; in the case of indication ii, for all the indicated SCGs; in the case of indication iii, for all the SCG configuration that are part of the UE 10's context).

In case of indication i, the UE 10 will choose the indicated SCG if it fulfills the trigger condition associated with it.

In case of indication ii or iii, the UE 10 will choose the SCG, among the SCGs that have fulfilled the trigger condition associated with them, the UE 10 may:
  chose the one that has the best radio conditions; or
  chose the one which exceeds its trigger condition the most; or
  chose the one with the highest priority (e.g. the first one in the list); or
  chose the first one it finds, which fulfills the condition;

If any SCG was chosen according to the above:
  If the UE 10 has received the sk-Counter in RRC Resume like message, the UE 10 may calculate a secondary key only for that SCG based on the master key and the received sk-Counter associated with the SCG;
  The UE 10 applies the corresponding stored SCG configuration:
    If indication ii) or iii) were received (i.e. the network such as the radio network node 12 has not specified an explicit SCG that the UE 10 has to add).
      The UE 10 indicates the chosen SCG to the network such as the radio network node 12 (e.g. in RRCResumeComplete)
      The UE 10 indicates the chosen SCG to the network such as the radio network node 12 by initiating a random access to the SCG
    Else, the UE 10 may not apply the SCG configuration, but keeps conditions based on connected mode measurements, possibly configured or resumed upon the reception of an RRCResume message (or subsequent RRCReconfiguration message);

(Seventh step) The UE 10 may e.g. send an RRC Resume Complete message to the network such as the radio network node 12 indicating that it has applied the received configurations In one embodiment, the UE 10 indicates to the MN that it has applied a conditional SCG configuration e.g. by indicating in the RRC Resume complete message:
  That it has applied a conditional SCG configuration (e.g. if there is only a single conditional configuration)
  Which configuration it has applied (e.g. SCG ID if there are multiple configurations)

In another embodiment, the UE 10 may indicate to the SN if it has activated a conditional SCG configuration by:
  initiating a random access procedure to the SCG it has selected and optionally transmit a message to the SN after it has performed the random access (e.g. RRCResumeComplete, RRCReconfigurationComplete, or a new message, or the LTE equivalents)
  Using a configured or predefined random access preamble to indicate that it is activating a conditional SCG configuration;

As stated above in action 601, the radio network node 12 configures the UE 10.

(First step) Configuring the UE 10 with the one or more conditional SCG addition configurations containing i) a secondary cell group configuration and/or ii) a trigger condition configuration (e.g. like an A4 event configuration as defined in ReportConfigNR);
  Configuring the conditional SCG addition configuration e.g. according to any one or more out of the options below:
    Option 1a: while the UE 10 is in CONNECTED state (e.g. via RRCReconfiguration or in a new message like RRCConditionalReconfiguration); and/or
    Option 1b: during the UE 10's transition to a power saving state (e.g. IDLE without stored context, IDLE with stored context, INACTIVE, etc. via e.g. RRCRelease); and/or
    Option 1c: if UE 10 is configured with an SCG while in CONNECTED state, the network such as the radio network node 12 can send an indication, e.g. during the UE 10's transition to a power saving state (e.g. IDLE without stored context, IDLE with stored context, INACTIVE, etc., via e.g. RRCRelease) to the UE 10 to treat current SCG configurations as a conditional SCG addition configuration; and/or
    Option 1d: during the UE 10's transition from a power saving state to a CONNECTED state (e.g. RRCResume).

In one embodiment, the radio network node 12 may transmit a sk-Counter as part of the conditional SCG configurations message, to be used to derive secondary keys associated to the SNs upon resumption.

In another embodiment, the radio network node transmits a separate sk-Counter for each configured SCG configurations.

Configuring the one or more trigger conditions e.g. according to any one or more out of the options below:
Option 2a: while the UE 10 is in CONNECTED state (e.g. via RRCReconfiguration); and/or
Option 2b: during the UE 10's transition to a power saving state (e.g. via RRCRelease); and/or
Option 2c: during the UE 10's transition from a power saving state to a CONNECTED state (e.g. RRCResume); and/or
Option 2d: via a system broadcast or paging prior/during the transition from a power saving state to a CONNECTED state.

(Second step) The radio network node 12 configures the UE 10 with an idle/inactive measurement configuration to be used in a power saving state (e.g. IDLE without stored context, IDLE with stored context, INACTIVE, etc.) e.g. according to any one or more out of the options below:
Option 1: configuring the UE 10 with idle/inactive measurement configuration while the UE 10 is in CONNECTED state (e.g. via RRCReconfiguration or in a new message like RRCConditionalReconfiguration); and/or
Option 2: configuring the UE 10 with idle/inactive measurement configuration during the UE 10's transition to a power saving state (e.g. IDLE without stored context, IDLE with stored context, INACTIVE, etc., via RRCRelease); and/or
Option 3: configuring the UE 10 with idle/inactive measurement configuration while the UE 10 is in a power saving state (e.g. IDLE without stored context, IDLE with stored context, INACTIVE, etc., via system information broadcast).

(Third Step) The radio network node 12 may transition the UE 10 to enter a power saving state (e.g. IDLE without stored context, IDLE with stored context, INACTIVE, etc.), e.g., transmitting an RRC Release like message (with or without a suspendConfig);
In one variant, the radio network node 12 sends a message to each SN node that is prepared (i.e. those that the radio network node has prepared for the UE 10's conditional addition in the above steps), and in this message including information such as what secondary keys to use when/if the UE 10 resumes later on with an SCG configuration associated with the SN; and/or
Optionally providing an sk-Counter to the UE 10 to be used to calculate the security key for each conditional SCG configuration to be used by the UE 10 upon resume; and/or
Indicating to the already prepared SNs to suspend the SCG, optionally including an updated secondary key.

(Fourth Step) corresponding to action 606, upon receiving an RRC message such as an RRC Resume Request like message from the UE 10, the radio network node 12 may check potential candidate cells for SCG addition upon resume, and optionally preparing one or more SNs e.g. triggering a (conditional) SCG addition request.
In one variant, the radio network node 12 decides to e.g. according to any one or more out of the below:
i) Allow the UE 10 to perform the addition of a specific SCG on resume (e.g. indicate the SCG, e.g. the SCG ID, that the UE 10 should add if the trigger conditions for this SCG is fulfilled); or i-a) In one variant, a new SCG configuration is included rather than an index (e.g. SCG ID) to an already existing SCG configuration provided to the UE 10 according to the above steps.
ii) Allow the UE 10 to perform SCG addition but provide an indication of a list of SCGs that can be added (e.g. network has prepared three SCGs, and indicates this, and UE 10 will choose the best one to add based on early measurements and trigger conditions); or
ii-a) In one variant, a list of SCG configurations is included rather than a list of indexes (e.g. SCG ID) of already existing SCG configurations provided to the UE 10 according to the above steps.
iii) Allow the UE 10 to use the SCG configurations stored in the UE 10 Inactive AS context as conditional SCG addition configurations; or
iv) Allow the UE 10 to perform SCG addition but not provide an indication of any SCG that can be added (e.g. it is completely up to the UE 10 to choose an SCG to add based on early measurements and trigger conditions and network has to later prepare the chosen SCG by the UE 10); or
v) Allow the UE 10 not to perform SCG addition on resume; or
vi) Release the conditional SCG configuration stored at the UE 10;

In one embodiment, the radio network node 12 may have prepared the candidate SNs with conditional SCG configurations and a secondary key and may provide the UE 10 with the sk-Counter in RRC Release like message (e.g. in Step one), if the radio network node 12 decides to prepare other SNs with conditional SCGs, a target node sends the secondary keys to these nodes based on the master key and the sk-Counter provided to the UE 10;
In another embodiment, the radio network node 12 provides the UE 10 with the sk-Counter in the RRC Resume message, in that case, the radio network node 12 provides all candidate SNs with the secondary keys based on the master key and the sk-Counter to be provided to the UE 10;

(Fourth Step—alternate) Upon receiving e.g. the RRC Resume Request like message that includes an indication that the UE 10 has selected an SCG based on e.g. early measurements and trigger conditions, e.g. according to any one or more out of the below:
If the SN associated with the indicated SCG was not prepared beforehand, the radio network node 12 e.g. the MN may:
send an SCG addition request to the SN, which could optionally include associated secondary key;
if the SN associated with the indicated SCG was prepared beforehand, the radio network node 12 may:
Send an SCG modification request to the SN to resume the SCG, which could optionally include associated secondary key;
For all the SNs that were prepared beforehand, if any, and that are not associated with the indicated SCG, the MN:
sends an SCG release request.

(Fifth Step): The radio network node 12 may further send (action 607) an RRC
Resume like message, optionally including an sk-counter for one or several SCG configurations, to the UE 10 that with an indication of the network's decisions (e.g. at least one of the aforementioned options in Step four). There may also be a default solution e.g. UE 10 performs action i) if no indication is provided.

(Fifth step-alternate): corresponding to fourth-step alternate. The radio network node 12 may send an RRCResume like message that can contain an indication that the SCG that the UE 10 has indicated in the RRCResumeRequest like message has been resumed properly.

The radio network node 12 may then corresponding to action 608 receive an RRC Resume Complete message from the UE 10

The procedure ends.

(Sixth step) The radio network node 12 may thus receive an RRC Resume Complete message from the UE 10 indicating that the UE 10 has applied the configurations received in the RRC Resume like message:

In one embodiment, the radio network node 12 receives an indication from the UE 10 that it has applied a conditional SCG configuration (e.g. in the RRCResumeComplete message). This indication may e.g. be indicating:

That the UE 10 has applied a conditional SCG configuration (e.g. if there is only a single conditional configuration);

Which configuration the UE 10 has applied (e.g. SCG ID if there are multiple configurations);

If the SN associated with the indicated SCG was not prepared beforehand, the radio network node 12 may perform any one or more out of the below:

Send an SCG addition request to the SN, which could optionally include associated secondary key;

if the SN associated with the indicated SCG was prepared beforehand, the radio network node 12 may:

Send an SCG modification request to the SN to resume the SCG, which could optionally include associated secondary key;

For all the SNs that were prepared beforehand, if any, and that are not associated with the indicated SCG, the radio network node 12 may:

send an SCG release request

Figure 7A:
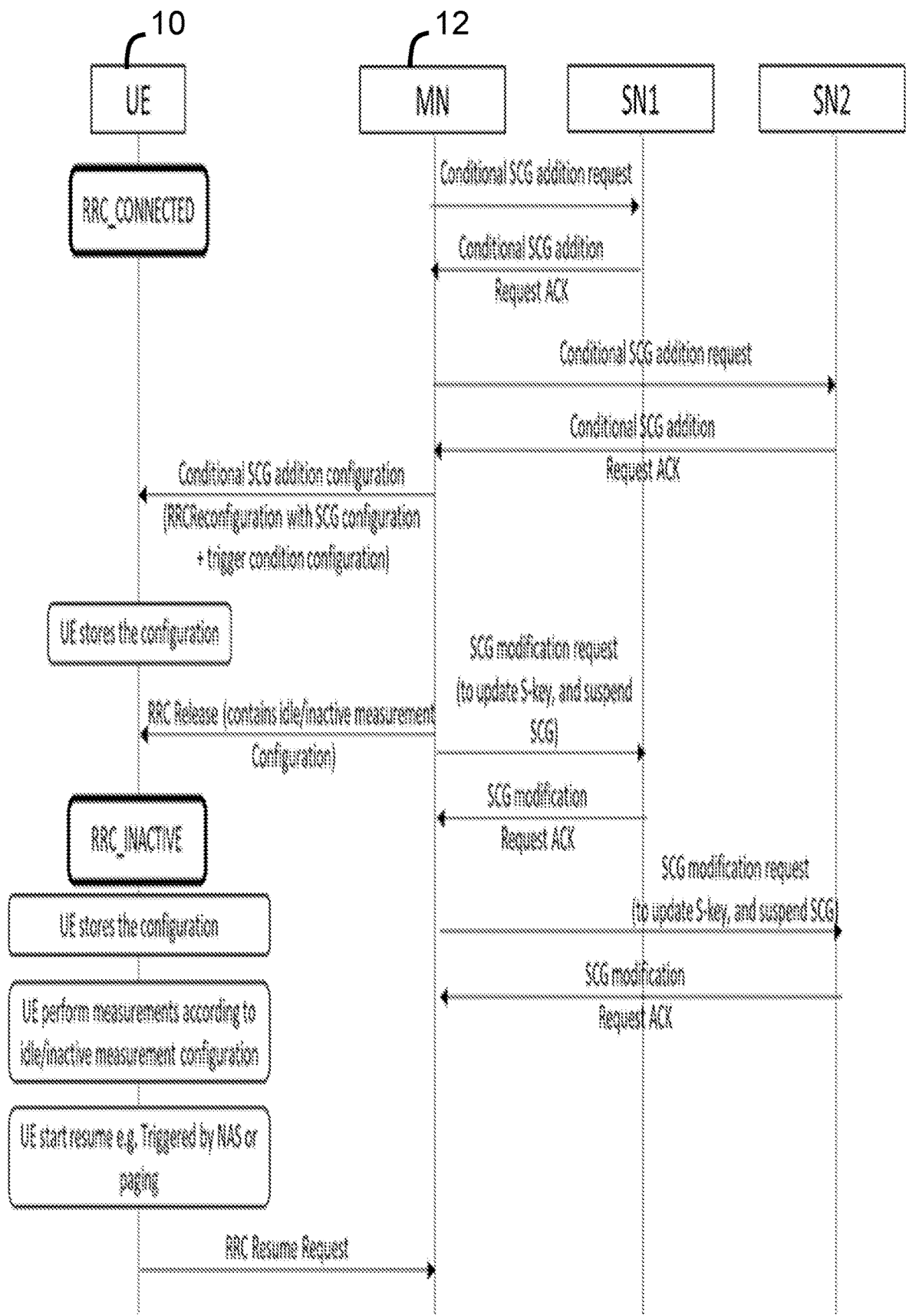
FIG. 7 shows examples of signalling schemes according to embodiments herein.

In another embodiment, the SN receives an indication that the UE 10 has activated a conditional SCG configuration e.g. by:

Receiving a random access preamble from the UE 10 which it has a configured conditional SCG configuration (e.g. an SCG C-RNTI);

Receiving a configured or pre-defined random access preamble from the UE 10 which it has a stored conditional SCG configuration;

FIGS. 7a and b, 8a and b, and 9a and b show examples of how embodiments herein may be implemented in terms of signaling flows.

In these figures the radio network node 12 is referred to as MN 12.

Figure 7B:
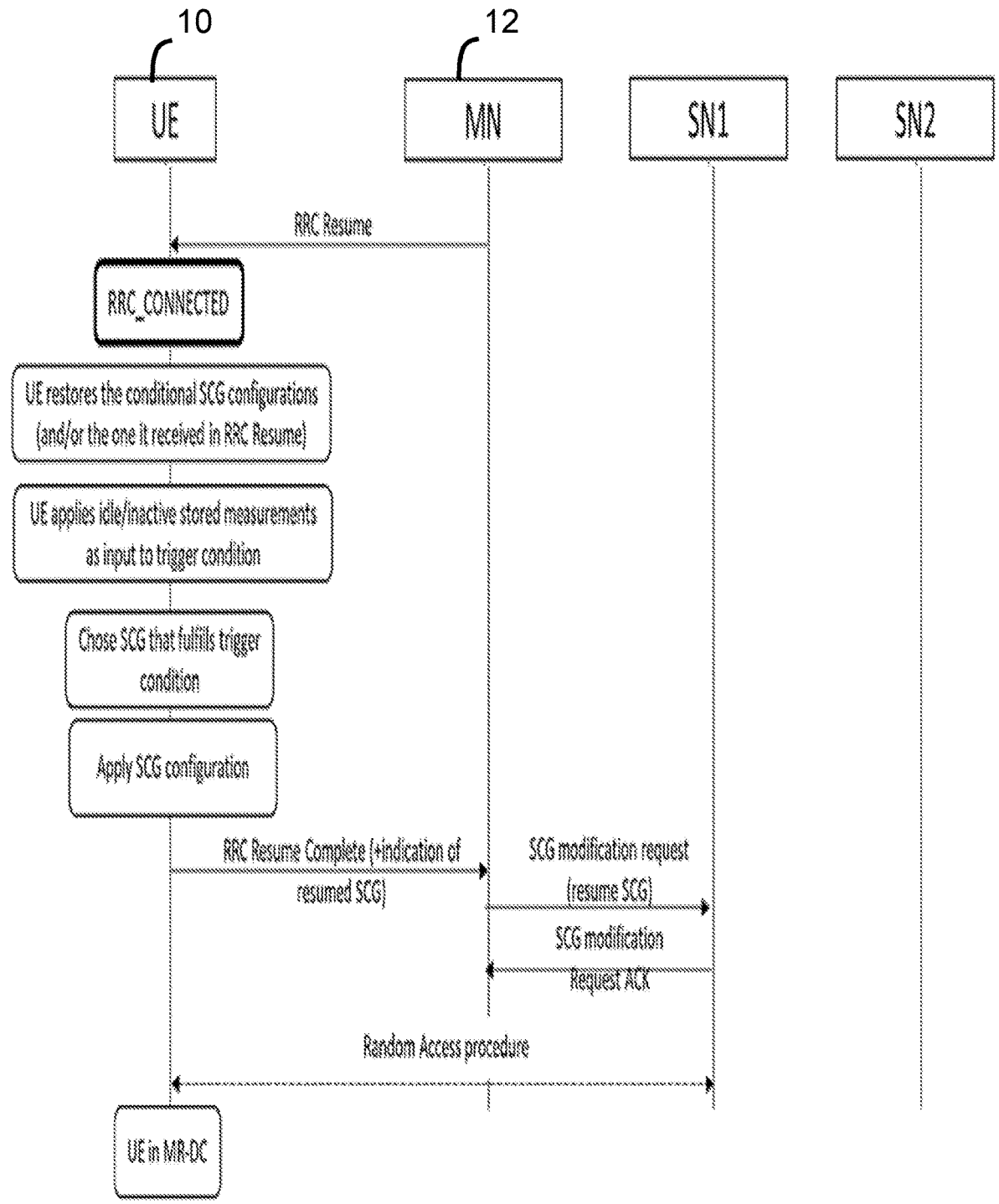

FIGS. 7a and 7b, show an example according to some embodiments herein. As shown in the figure, the method comprises the conditional SCG addition preparation, where the current serving node such as the radio network node 12, may send a conditional SCG addition request to one or more candidate secondary nodes SN1 and SN2 in the figure. The candidate nodes respond with a conditional addition request Acknowledge (ACK), if they have enough resources to admit the concerned UE 10. The current serving node then configures the UE 10 with the conditional SCG addition configuration that includes the candidate SCG configurations as well as the corresponding trigger conditions, which the UE 10 may store. Due to data inactivity, the UE 10 may be sent to the INACTIVE state via the RRC Release message, which may include an early measurement configuration. The current serving node also communicates this suspension to the candidate nodes, including additional information such as secondary keys to be used later when the UE 10 gets resumed. Upon the resumption of the connection, e.g. due to paging signifying downlink data arrival or upon arrival of UL data, the UE 10 checks if the trigger conditions are fulfilled for any of the stored SCG configurations by comparing the triggering thresholds with the measurements available, e.g. early measurements performed during INACTIVE state, and applies the SCG configuration that fulfills the conditions, and indicates to the radio network 12 in the RRC Resume complete message which SCG configuration it has applied. The current serving node may then communicate to the concerned secondary node SN1 in the figure, to resume the SCG.

Figure 8A:
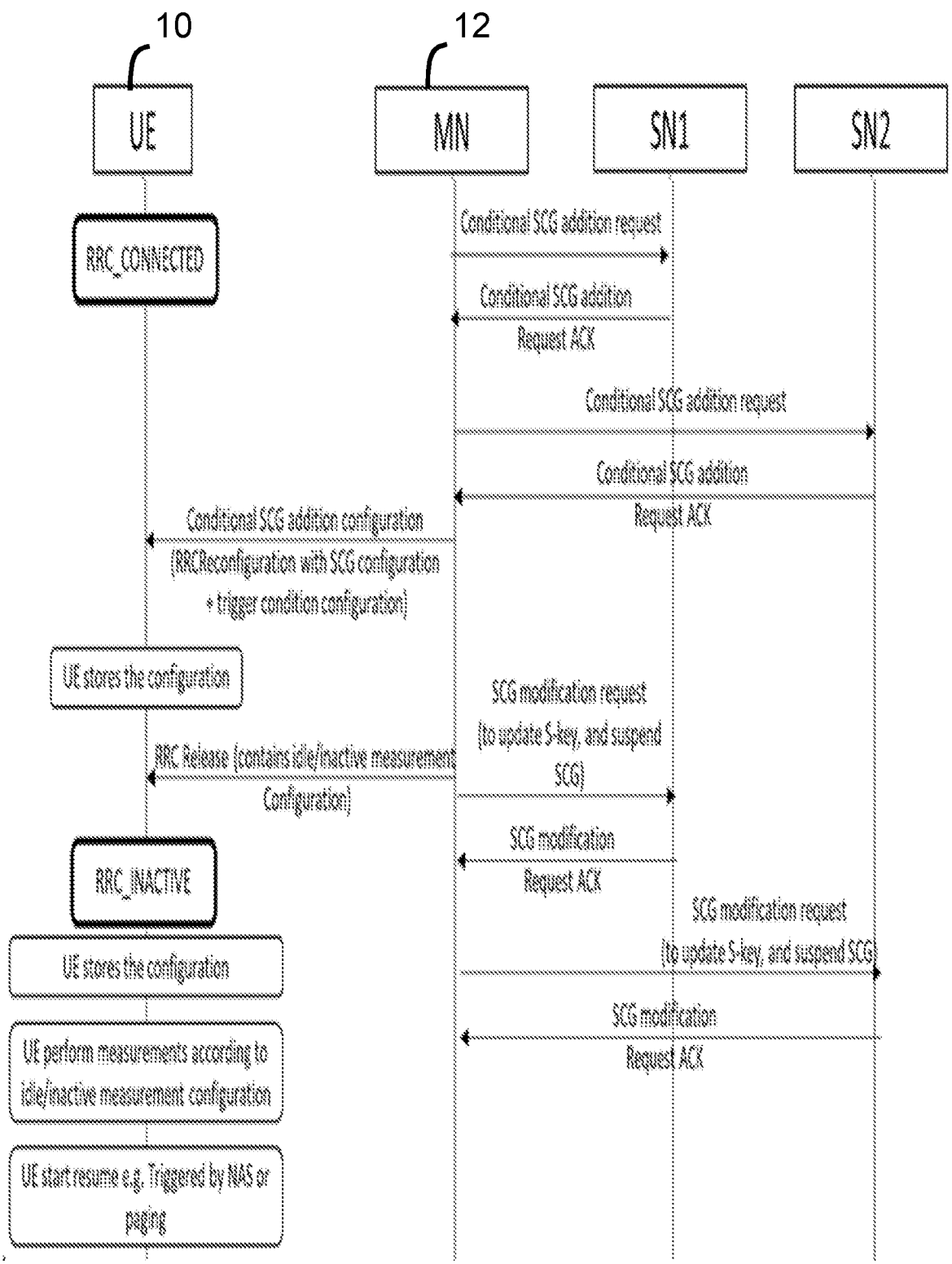
FIG. 8 shows examples of signalling schemes according to embodiments herein.
Figure 8B:
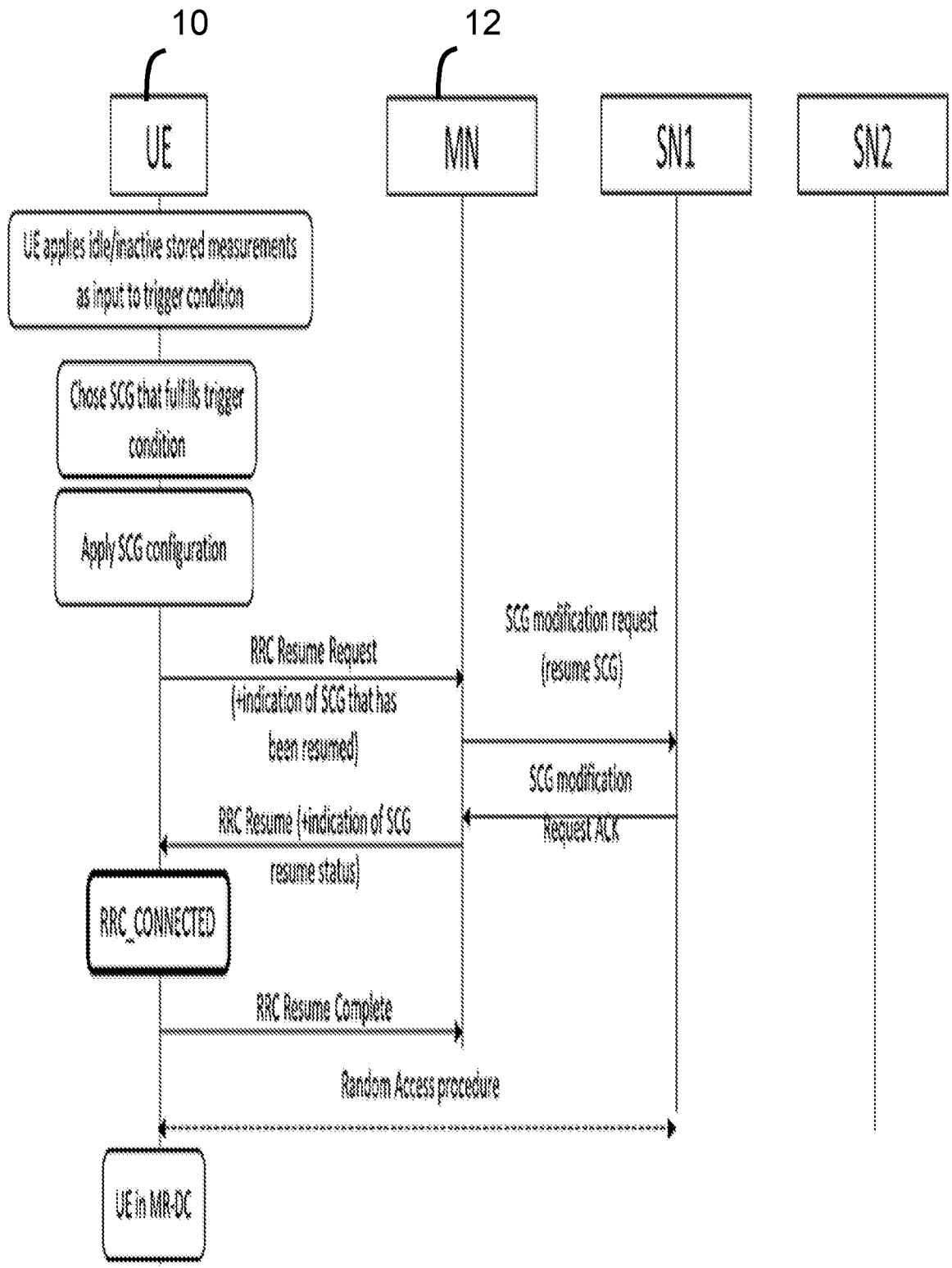

FIGS. 8a and b show an example according to some other embodiments that includes further alternate steps compared to FIGS. 7a and b, where the UE 10 applies the SCG configurations before sending the RRC Resume Request, and indicates to the network which SCG configuration it has applied in the RRC Resume Request message. The difference between the embodiments of FIGS. 7 and 8 is whether the SCG is applied before the resume message is received from the network; otherwise the UE 10 does the resume of the SCG autonomously without waiting for indication from the radio network node 12.

Figure 9A:
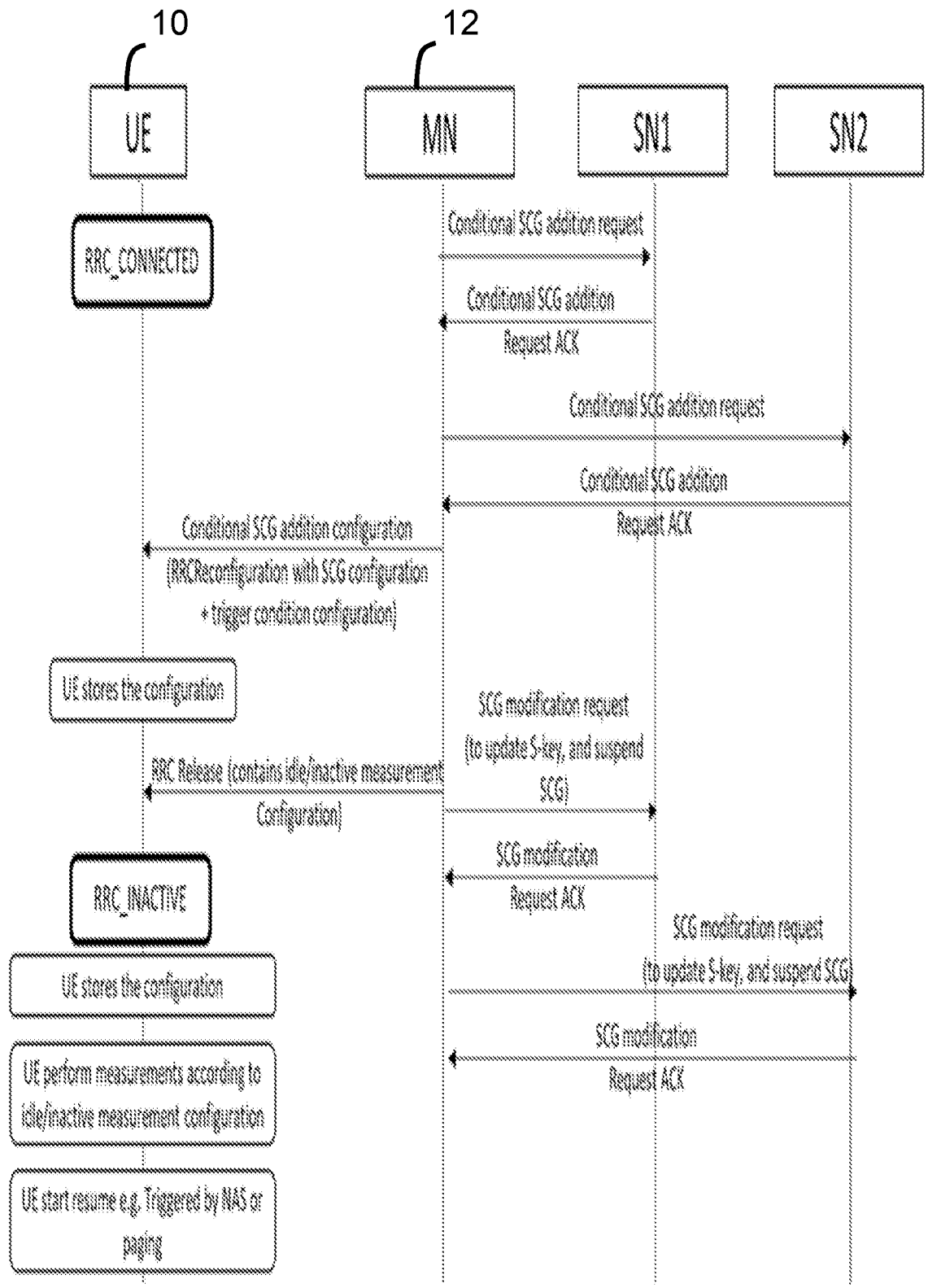
FIG. 9 shows examples of signalling schemes according to embodiments herein.
Figure 9B:
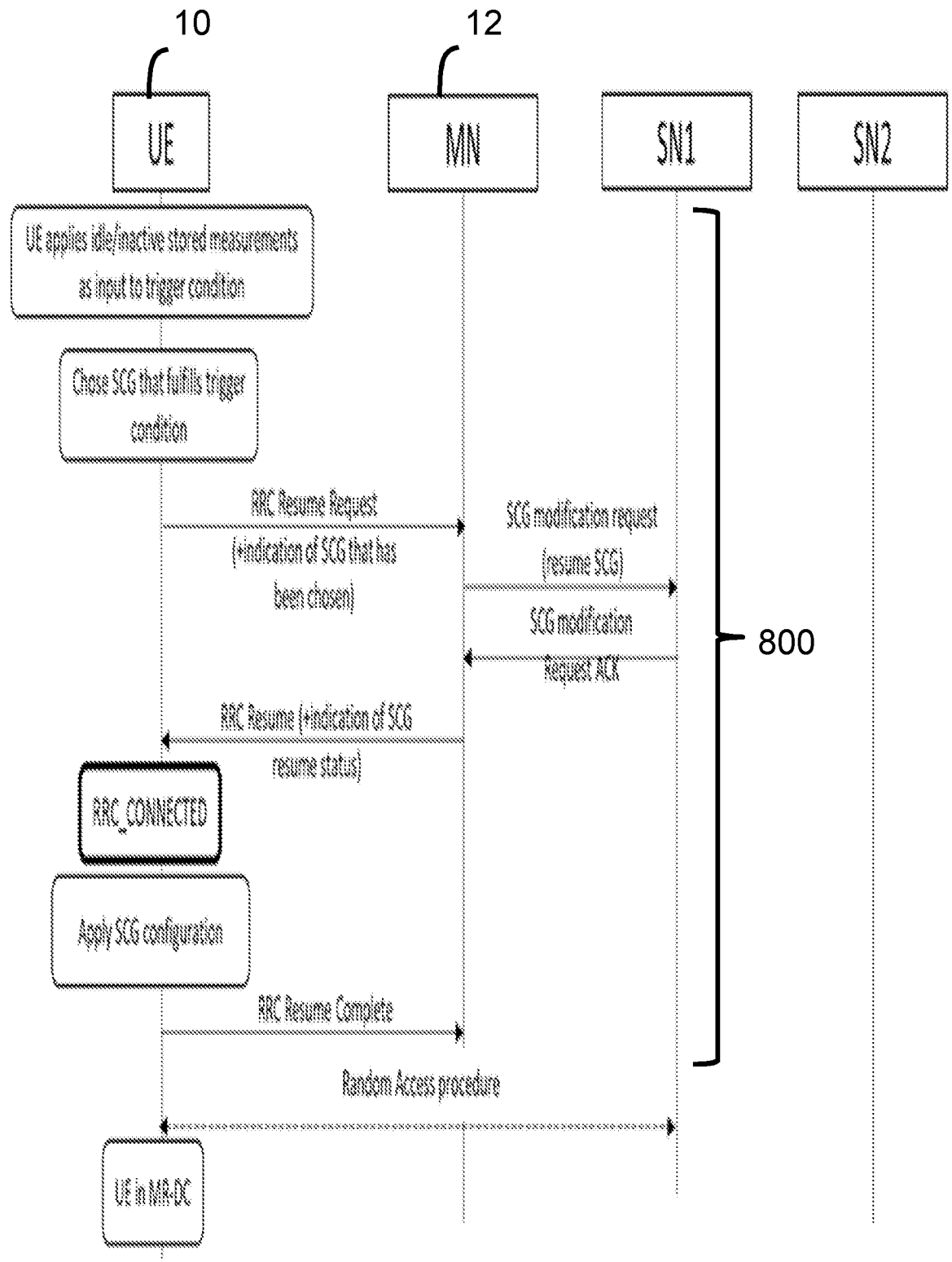

On the other hand, the embodiments of FIGS. 9a and b, the UE 10 doesn't resume autonomously, i.e. it sends indication which SCG fulfils the condition, and applies it only when the network has indicated it is OK to resume the SCG configuration in the Resume message. FIGS. 9a and b show an example according to some other embodiments that includes alternate steps compared to FIGS. 7a and b, and FIGS. 8a and b. In FIGS. 7a and b and 8a and b, the UE 10 applies the SCG configuration that fulfills the condition autonomously, as long as the trigger condition is fulfilled, and notifies the radio network node 12 that it has applied the configuration in the RRC Resume Complete message, FIGS. 7a and b, or the RRC Resume Request message, FIGS. 8a and b. On the other hand, in FIGS. 9a and b, the UE 10 indicates to the radio network node 12 which of the SCG configuration(s) fulfills the trigger conditions in the RRC Resume Request without applying the SCG configuration and applies the SCG configuration only after getting an indication from the network in the RRC Resume message that the concerned SCG can be resumed.

It is herein disclosed a method in a wireless terminal such as the UE 10 (e.g. for fast addition of an SCG) upon transitioning to CONNECTED state the method comprising:

(First step) Receiving and storing conditional SCG addition (First step) Receiving and storing (e.g. while in CONNECTED state) a conditional SCG addition configuration containing i) a secondary cell group configuration and ii) at least a trigger condition configuration (e.g. like an A4 event configuration as defined in ReportConfigNR) per SCG configuration to be stored;

The conditional SCG configuration here may comprise at least one RRCReconfiguration message (or the contents of it) comprising SCG configurations, SN radio bearer configurations, SN security configurations and/or SN measurement configurations that shall not be applied upon reception of the message, but stored, as described in the first step. If the current proposed NR message for Release 15 late drop used to add an SCG, is used that would be the mrdc- SecondaryCellGroupConfig, which contain either an NR RRCReconfiguration message or an E-UTRA RRCConnectionReconfiguration message to configure the SCG.

In addition, in order to provide a conditional configuration for the SN and or SCG, a conditional radioBearerConfig2 can be provided, which would configure the PSCP and SDAP entities of the RBs.

Furthermore, in order to activate security in a candidate target SN, the UE 10 must be provided with a security key for the SN. This is done by providing the UE 10 with the SK-Counter, which the UE 10 uses together with the security key for the master node (e.g. KgNB) to calculate the key for the secondary node (e.g. S-KgNB or S-KeNB). The message is not limited to that and UE 10 may also receive and store other information to be reconfigured when the SCG is being added e.g. measurement configuration, radio bearer configuration, etc., as shown below:

This conditional SCG addition configuration also contains an associated trigger condition configuration whose input should be at least cell level values for at least one measurement quantity e.g. cell reference signal received power (RSRP), cell RSRP or cell signal to interference plus noise ratio (SINR). Beam measurement information may also be used as triggering criteria, e.g., combined with cell level measurement quantities. The triggering may also be based on combination of measurements based on multiple quantities and, the trigger quantities that are described herein are at least RSRP, RSRQ and SINR. They may be based on cell measurements, i.e. cell level RSRP, cell level RSRQ, cell level SINR. When the method describes the triggering of a condition based on multiple trigger quantities, the method comprises any combination of the following configurations:

RSRP
RSRQ
SINR

Applying either one, two, or all three of these configurations in any combination.

When the method describes the fulfilment of conditions associated to multiple quantities, the method may comprise the monitoring of multiple conditions in parallel and, triggering the conditional SCG addition only when the configured conditions for multiple trigger quantities are fulfilled.

The trigger quantities that are described herein are based on one or both of SS/PBCH Block (SSB) and CSI-RS. The cell level measurements are performed based on these reference signals i.e. cell level SS-RSRP, cell level SS-RSRQ, cell level SS-SINR, cell level CSI-RSRP, cell level CSI-RSRQ, cell level CSI-SINR. When the method describes the triggering of a condition based on multiple trigger quantities, the method comprises one or any combination of the following signals:

SS-RSRP;
SS-RSRQ;
SS-SINR;
CSI-RSRP;
CSI-RSRQ;
CSI-SINR;

The configuration may comprise any configuration using one, two, three, four, five, or six of these signals, in any combination.

Below, an example is given, based on the current NR EventTriggerConfig structure used for configuring event triggered measurement reporting, to define the conditional SCG configuration trigger conditions.

```
EventTriggerConfigForSCG::=        SEQUENCE {
  eventId              CHOICE {
    eventX1              SEQUENCE {
      x1-Threshold            MeasTriggerQuantityForCHO,
      hysteresis             HysteresisPerQuantity,
      timeToTrigger           TimeToTriggerPerQuantity
    },
    eventX2              SEQUENCE {
      x2-Threshold            MeasTriggerQuantityForCHO,
      hysteresis             HysteresisPerQuantity,
      timeToTrigger           TimeToTriggerPerQuantity
    },
    eventX3              SEQUENCE {
      x3-Offset              MeasTriggerQuantityOffsetForCHO,
      hysteresis             HysteresisPerQuantity,
      timeToTrigger           TimeToTriggerPerQuantity
    },
    eventX4              SEQUENCE {
      x4-Threshold            MeasTriggerQuantity,
      hysteresis             HysteresisPerQuantity,
      timeToTrigger           TimeToTriggerPerQuantity
    },
    eventX5              SEQUENCE {
      x5-Threshold1           MeasTriggerQuantity,
      x5-Threshold2           MeasTriggerQuantity,
      hysteresis             HysteresisPerQuantity,
      timeToTrigger           TimeToTriggerPerQuantity
    },
    eventX6              SEQUENCE {
      x6-Offset              MeasTriggerQuantityOffsetForCHO,
      hysteresis             HysteresisPerQuantity,
      timeToTrigger           TimeToTriggerPerQuantity
    },
    ...
  },
  HysteresisPerQuantity::=                  SEQUENCE {
    rsrp         INTEGER (0..30)     OPTIONAL,
    rsrq         INTEGER (0..30)     OPTIONAL,
    sinr         INTEGER (0..30)     OPTIONAL
  }
  MeasTriggerQuantityOffsetForCHO ::=              SEQUENCE {
    rsrp         INTEGER (-30..30)   OPTIONAL,
    rsrq         INTEGER (-30..30)   OPTIONAL,
    sinr         INTEGER (-30..30)   OPTIONAL
  }
  MeasTriggerQuantityForCHO ::=                  SEQUENCE {
    rsrp         INTEGER (-30..30)   OPTIONAL,
    rsrq         INTEGER (-30..30)   OPTIONAL,
    sinr         INTEGER (-30..30)   OPTIONAL
  }
  TimeToTriggerPerQuantity ::=                  SEQUENCE {
    rsrp         TimeToTriggerOPTIONAL,
    rsrq         TimeToTriggerOPTIONAL,
    sinr         TimeToTriggerOPTIONAL
}
```

Upon the reception of that conditional SCG configuration, the UE 10 does not apply the message as it is the case in the prior art (i.e. current NR and LTE Release 15 specifications), but only stores the configuration, possibly in a UE 10 variable. In addition, even though the UE 10 has received a triggering condition configuration (like the Ax events shown above) the UE 10 does not perform any measurements upon reception (as in the case of conditional handover feature being discussed for Release 16). Instead, the UE 10 only stores the configurations.

In one variant, the conditional SCG addition configuration (including the SCG configuration to be stored and the triggering condition configuration) is received by the UE 10 in an RRCReconfiguration message in a field that comprises a list of RRCReconfiguration(s) containing a secondary cell group configuration and each being associated to a trigger condition configuration.

In another variant, the UE 10 may receive the configuration in a message called RRCConditionalReconfiguration message.

In another variant, the UE 10 receives that in an RRC Release like message when the UE 10 transitions to IDLE or INACTIVE state (e.g. message contains a suspend configuration).

In one variant the UE 10 stores the conditional SCG configuration and the associated trigger condition configuration in the UE 10 context (called in RRC specifications the e.g. UE 10 Inactive AS context). By doing that, this may later be restored at some point in time and be used by the UE 10. At the network side, that UE 10 context may also be used by the network in further procedures when the UE 10 tries to resume.

In another variant, if the UE 10 is configured with an SCG in CONNECTED state, it receives an indication in e.g. RRCReconfiguration or RRCRelease message to treat the current SCG configurations as a conditional SCG addition configuration. This message could also contain an associated trigger condition configuration.

(Second Step) Receiving and storing idle/inactive measurement configurations (Second step) Receiving and storing while in CONNECTED state an idle/inactive measurement configuration to be used in a power saving state (e.g. IDLE without stored context, IDLE with stored context, INACTIVE, etc.);

The UE 10 may be configured with an RRC Release like message containing that idle/inactive measurement configuration to be used upon the transition to a power saving state, e.g., IDLE, INACTIVE, etc. An example of that configuration is shown below, which contains a list of measurement information per frequency (for each RAT, in this example, a list of LTE frequencies to be measured and a list of NR frequencies to be measured). And, for each frequency, additional information regarding how measurements shall be performed such as NR cell quality derivation parameters, validity areas, thresholds, etc. The exact configuration is not part of embodiments herein and is mentioned here as an example, as shown below:

```
RRCRelease-v16-IEs ::= SEQUENCE {
    measIdleInactiveConfig-r15
    MeasIdleInactiveConfigDedicated-r16      OPTIONAL,    -- Need N
    nonCriticalExtension                  SEQUENCE { }              OPTIONAL
}
MeasIdleInactiveConfigDedicated-r16   ::=  SEQUENCE {
    measIdleInactiveCarrierListNR-r16                  NR-CarrierList-r16
    OPTIONAL,       -- Need N
    measIdleInactiveCarrierListEUTRA-r16              EUTRA-CarrierList-r16
    OPTIONAL,       -- Need N         measIdleInactiveDuration-r16
    ENUMERATED     {sec10, sec30, sec60, sec120,
                                      sec180, sec240, sec300, spare},
    ...
}
EUTRA-CarrierList-r16   ::=   SEQUENCE (SIZE (1..maxFreqIdleInactive))
OF MeasIdleInactiveCarrierEUTRA-r16
measIdleInactiveCarrierListNR-r16::=   SEQUENCE (SIZE
(1..maxFreqIdleInactive)) OF MeasIdleInactiveCarrierNR-r16
MeasIdleInactiveCarrierNR-r16::=                   SEQUENCE {
// NR related configuration for early measurements
    ssbFrequency              ARFCN-ValueNR                OPTIONAL,    -- Cond
SSBorAssociatedSSB
    ssbSubcarrierSpacing            SubcarrierSpacing              OPTIONAL,    --
Cond SSBorAssociatedSSB
    smtc1          SSB-MTC                      OPTIONAL, -- Cond
SSBorAssociatedSSB
    smtc2          SSB-MTC2                     OPTIONAL, -- Cond
IntraFreqConnected
    refFreqCSI-RS           ARFCN-ValueNR                  OPTIONAL, -- Cond
CSI-RS
    absThreshSS-BlocksConsolidation ThresholdNR
OPTIONAL, -- Need R
    absThreshCSI-RS-Consolidation ThresholdNR                              OPTIONAL,
-- Need R
    nrofSS-BlocksToAverage         INTEGER (2..maxNrofSS-BlocksToAverage)
OPTIONAL, -- Need R
    nrofCSI-RS-ResourcesToAverage          INTEGER (2..maxNrofCSI-RS-
ResourcesToAverage)         OPTIONAL, -- Need R
    quantityConfigIndex           INTEGER (1..maxNrofQuantityConfig),
    freqBandIndicatorNR-v1530                  FreqBandIndicatorNR
OPTIONAL, -- Need R
    quantityConfigIndex           INTEGER (1..maxNrofQuantityConfig),
    refFreqCSI-RS         ARFCN-ValueNR                OPTIONAL, -- Cond
CSI-RS
    referenceSignalConfig             Reference SignalConfig,
// Beam Measurement configuration
    reportQuantityRS-Indexes             MeasReportQuantity            OPTIONAL,
-- Need R
    maxNrofRS-IndexesToReport          INTEGER (1..maxNrofIndexesToReport)
OPTIONAL, -- Need R
    includeBeamMeasurements         BOOLEAN,
// Other early measurement configuration
    validityArea-r16                     CellListNR-r16
    OPTIONAL,     -- Need N
    measCellListNR-r16                  CellListNR-r16
    OPTIONAL,     -- Need N
```

```
    reportQuantities                    ENUMERATED {rsrp, rsrq, both},
    qualityThresholdNR-r16              SEQUENCE {
        idleInactiveRSRP-Threshold-r16      RSRP-Range
OPTIONAL,       -- Need N
        idleInactiveRSRQ-Threshold-r16      RSRQ-Range
OPTIONAL,       -- Need N           idleInactiveSINR-Threshold-r16
SINR-Range              OPTIONAL -- Need N
    }                                                   OPTIONAL,   --
Need N
    . . .
}
CellListNR-r16   ::=       SEQUENCE (SIZE (1.. maxCellMeasIdleNR-r16))
OF PCI-RangeIndexList
PCI-RangeElement ::=           SEQUENCE {
    pci-RangeIndex     PCI-RangeIndex,
    pci-Range      PCI-Range
}
PCI-RangeIndex ::=      INTEGER (1..maxNrofPCI-Ranges)
PCI-Range    ::=           SEQUENCE {
    start          PhysCellId,
    range          ENUMERATED {n4, n8, n12, n16, n24, n32, n48, n64,
n84,
            n96, n128, n168, n252, n504, n1008,spare1} OPTIONAL -
- Need S
}
MeasIdleInactiveCarrierEUTRA-r16::=             SEQUENCE {
    carrierFreq        ARFCN-ValueEUTRA,
        allowedMeasBandwidth        EUTRA-AllowedMeasBandwidth,
        validityArea                EUTRA-CellList
OPTIONAL,       -- Need N
    measCellList                    EUTRA-CellList
OPTIONAL,       -- Need N
    reportQuantities                ENUMERATED {rsrp rsrq, both},
    qualityThreshold                MeasTriggerQuantityEUTRA
    . . .
}
EUTRA-CellList ::=          SEQUENCE (SIZE (1. .
maxCellMeasIdleInactive))      OF EUTRA-PhysCellId
```

A UE 10 variable to store the configuration may be defined e.g. VarMeasIdleInactiveConfig so that in the specifications a stored configuration may be used by another procedure. Upon reception of the configuration when the UE 10 is CONNECTED this variable may be cleared i.e. it should be empty without any configuration stored. This UE 10 variable could be defined as follows:

VarMeasIdleInactiveConfig

The UE 10 variable VarMeasIdleInactiveConfig includes the configuration of the measurements to be performed by the UE 10 while in RRC_IDLE or RRC_INACTIVE for NR and/or E-UTRA inter-frequency measurements. The UE 10 performs logging of these measurements only while in RRC_IDLE or RRC_INACTIVE.

VarMeasIdleInactiveConfig UE Variable mation block associated to the cell the UE 10 is being suspended to INACTIVE or released to IDLE.

The received idle/inactive measurement configuration may also be provided in another message e.g. an RRCReconfiguration or an RRCConditionalReconfiguration.

The received idle/inactive measurement configuration may be provided with the conditional SCG addition configuration described in previous step, e.g., in the same message.

Notice that having that configuration stored, upon entering INACTIVE or IDLE or any other power saving state, the UE 10 shall perform idle and/or inactive measurements according to that stored idle and/or inactive configuration.

(Third step) Entering power saving state (e.g. IDLE, INACTIVE) and performing idle/inactive configured measurements

```
-- ASN1START
-- TAG-VAR-MEAS-IDLE-INACTIVE-CONFIG-START
VarMeasIdleInactiveConfig-r16   ::=       SEQUENCE {
    measIdleInactiveCarrierListNR-r16       NR-CarrierList-r16     OPTIONAL,   Need N
    measIdleInactiveCarrierListEUTRA-r16    EUTRA-CarrierList-r16  OPTIONAL,   Need N
    measIdleInactiveDuration-r16            ENUMERATED {sec10, sec30, sec60, sec120,
                                                sec180, sec240, sec300, spare},
}
-- ASN1STOP
-- TAG-VAR-MEAS-IDLE-INACTIVE-CONFIG-START
```

Part of the measurement configuration may be absent in the RRC Release message. In that case, the UE 10 may acquire the measurement configuration from a system infor- (Third step) Upon entering the power saving state (e.g. IDLE without stored context, IDLE with stored context, INACTIVE, etc.), e.g., after receiving an RRC Release like message (with or without a suspendConfig) the UE 10 starts performing measurements according to the received measurement configuration and store these idle/inactive measurements;

The UE 10 performs the measurements while the timer T331 (or equivalent) is running.

When the timer T331 expires the UE 10 stops to perform the measurements.

The timer T331 (or equivalent) is stopped while the UE 10 is in RRC_IDLE or RRC_INACTIVE if the UE 10 selects/re-selects a cell that does not belong to a validity area configured in the measurement configuration, if such a concept is also defined in NR. A possible example of implementations is described below.

Below, an example of the procedure for performing early measurements, which is directly adopted for the 3GPP LTE release-15 early measurement procedures.

5.6.x Idle/Inactive Mode Measurements 5.6.x.1 General

This procedure specifies the measurements done by a UE 10 in RRC_IDLE or RRC_INACTIVE when it has an IDLE/INACTIVE mode measurement configuration and the storage of the available measurements by a UE 10 in RRC_IDLE, RRC_INACTIVE and RRC_CONNECTED.

5.6.x.2 Initiation

While T331 is running, the UE 10 shall:

1> perform the measurements in accordance with the following:
  2> for each entry in measIdleInactiveCarrierListEUTRA within VarMeasIdleInactiveConfig:
    3> if UE 10 supports carrier aggregation and/or dual connectivity between serving carrier and the carrier frequency and bandwidth indicated by carrierFreq and allowedMeasBandwidth within the corresponding entry;
      4>perform measurements in the carrier frequency and bandwidth indicated by carrierFreq and allowedMeasBandwidth within the corresponding entry;
    NOTE: The fields s-NonIntraSearch in EUTRA SystemInformationBlockType3 do not affect the UE 10 measurement procedures in IDLE mode. How the UE 10 performs measurements in IDLE mode is up to UE 10 implementation as long as the requirements in TS 36.133 [16] are met for measurement reporting. UE 10 is not required to perform idle measurements if SIB2 idle measurement indication is not configured.
    4> if the measCellList is included:
      5> consider PCell and cells identified by each entry within the measCellList to be applicable for idle mode measurement reporting;
    4> else:
      5> consider PCell and up to maxCellMeasIdle strongest identified cells whose RSRP/RSRQ measurement results are above the value(s) provided in qualityThreshold (if any) to be applicable for idle mode measurement reporting;
    4> store measurement results for cells applicable for idle mode measurement reporting within the VarMeasIdleInactiveReport;
    3> else:
      4> do not consider the carrier frequency to be applicable for idle mode measurement reporting;
  2> for each entry in measIdleInactiveCarrierListNR within VarMeasIdleInactiveConfig:
    3> if UE 10 supports carrier aggregation and/or dual connectivity (or any form of MR-DC) between serving carrier and the carrier frequency indicated by ssbFrequency within the corresponding entry;
      4> perform measurements in the carrier frequency and bandwidth indicated by ssbFrequency within the corresponding entry;
    4> if the measCellListNR-r16 is included:
      5> consider PCell and cells identified by each entry within the measCellListNR-r16 to be applicable for idle/inactive mode measurement reporting;
    4> else:
      5> consider PCell and up to maxCellMeasIdleNR-r16 strongest identified cells whose RSRP/RSRQ/SINR measurement results are above the value(s) provided in qualityThresholdNR (if any) to be applicable for idle mode measurement reporting;
    4> if the reportQuantityRS-Indexes and maxNrofRS-IndexesToReport is included:
      5> perform measurements for the indicated measurement quantities in reportQuantityRS-Indexes whose RSRP/RSRQ/SINR measurement results are above the value(s) provided in absThreshSS-BlocksConsolidation or absThreshCSI-RS-Consolidation (if any);
    4> store measurement results for cells applicable for idle mode measurement reporting within the VarMeasIdleReport;
    3> else:
      4> do not consider the carrier frequency to be applicable for idle/inactive mode measurement reporting;
1> if validityArea is configured in VarMeasIdleInactiveConfig and UE 10 reselects to a serving cell whose physical cell identity does not match any entry in validityArea for the corresponding carrier frequency:
  2> stop T331;

(Fourth step) Triggering RRC Resume procedure and receiving indication how to handle conditional SCG configurations In one embodiment, the UE 10 uses available idle/inactive measurements as input to the triggering condition configuration for SCG addition upon the resume initiation i.e. before it transmits the RRC Resume Request like message. Then, the UE 10 restores the UE 10 context (e.g. restores the UE 10 Inactive AS Context including the conditional SCG configuration and the trigger condition configuration, possibly configured per candidate SCG cell). Since both configurations are restored, if the UE 10 has available idle/inactive measurements (previously configured), the UE 10 uses these measurements as input to the restored trigger condition configuration(s). If the triggering condition is then fulfilled to at least one cell, the UE 10 applies the restored conditional SCG configuration associated to the fulfilled condition and perform actions upon i.e. SCG addition to at least one cell fulfilling the trigger condition. The control from the network indicating that the UE 10 should do that may be an indication broadcasted in system information. And, upon trying to resume in a cell the UE 10 reads a system information block and understands it should apply the method if the indication is present. In another alternative this is indicated in paging message addressed to the UE 10. In that solution, there are two variants for the indications to the network regarding the UE 10 actions on the conditional SCG configurations and trigger conditions based on idle/ inactive measurements described above. In one variant, the UE 10 includes indication(s) in RRC Resume Request like message, in another variant in RRC Resume Request Complete like message, in another variant in another message e.g. UE 10 Information Response.

(Fourth Step) Upon triggering the resume procedure, the UE 10 receives an RRC Resume like message that can contain, in addition to a possible trigger condition configuration as discussed in step 1 above, different indications:
  i) indication to perform the addition of a specific SCG on resume (e.g. indicate the SCG, e.g. the SCG ID, that the UE 10 should add if the trigger conditions for this SCG is fulfilled); or
  ii) indication to perform SCG addition that contains a list of SCGs that can be added (e.g. network has prepared three SCGs, and indicates this, and UE 10 will choose the best one to add based on early measurements and trigger conditions); or
  iii) indication to perform SCG addition without an indication of any SCG that can be added (e.g. it is completely up to the UE 10 to choose an SCG to add based on early measurements and trigger conditions and network has to later prepare the chosen SCG by the UE 10); or
  iv) indication to not perform SCG addition on resume; or
  v) indication to (partially or completely) release the conditional SCG configuration stored at the UE 10;

In one embodiment, the UE 10 also receives an sk-Counter in the RRC Resume like message, which is to be used to derive the secondary keys associated to the conditional SCG configurations There may also be a default option (e.g. UE 10 performs action i) if no indication is provided in the RRC Resume like message.

An example of this extended RRCResume message (based on draft version of TS 38.331 v 15.5.0) is shown below:

RRCResume Message

```
-- ASN1START
-- TAG-RRCRESUME-START
RRCResume     ::=      SEQUENCE {
    rrc-TransactionIdentifier          RRC-TransactionIdentifier,
    criticalExtensions            CHOICE {
        rrcResume     RRCResume-IEs,
        criticalExtensionsFuture           SEQUENCE { }
    }
}
RRCResume-IEs    ::=      SEQUENCE {
    radioBearerConfig         RadioBearerConfig                      OPTIONAL,-- Need M
    masterCellGroup         OCTET STRING (CONTAINING CellGroupConfig)
OPTIONAL, -- Need M
    measConfig     MeasConfig                          OPTIONAL, -- Need M
    fullConfig         ENUMERATED {true}                    OPTIONAL, -- Need N
    lateNonCriticalExtension            OCTET STRING                      OPTIONAL,
    nonCriticalExtension          RRCResume-v15xy-IEs
OPTIONAL
}
RRCResume-v15xy-IEs   ::=            SEQUENCE {
    radioBearerConfig2         OCTET STRING (CONTAINING
RadioBearerConfig)         OPTIONAL, -- Need M
    sk-Counter      SK-Counter                         OPTIONAL, -- Cond S-KeyChange
    nonCriticalExtension         RRCResume-v16xy-IEs
OPTIONAL
}
RRCResume-v16xy-IEs   ::=            SEQUENCE {
    conditionalSCG-ToReleaseList            SEQUENCE (SIZE
(1..maxConditionalSCG-Id)) OF conditionalSCG-Id                     OPTIONAL, -- Need N
    conditionalSCG-ConfigList          SEQUENCE (SIZE
(1..maxConditionalSCG-Id)) OF conditionalSCG-Config
OPTIONAL, -- Need M
    conditional-SK-Counter         SK-Counter                      OPTIONAL, -- Need N
    nonCriticalExtension       SEQUENCE{ }                    OPTIONAL
}
ConditionalSCG-Config   :: =          SEQUENCE {
    conditionalSCG-Id        INTEGER {1.. maxConditionalSCG-Id}
    radioBearerConfig2         OCTET STRING (CONTAINING
RadioBearerConfig)          OPTIONAL, -- Need M
    mrdc-SecondaryCellGroupConfig              SetupRelease { MRDC-SecondaryCellGroupConfig }           OPTIONAL, -- Need M
    eventTriggersForSCG        EventTriggerConfigForSCG                    OPTIONAL, -- Need M
    nonCriticalExtension       SEQUENCE{ }                    OPTIONAL
}
MRDC-SecondaryCellGroupConfig   ::=   SEQUENCE {
    mrdc-ReleaseAndAdd-r15            ENUMERATED {true}
```

```
        OPTIONAL, -- Need N
    mrdc-SecondaryCellGroup              CHOICE {
        nr-SCG          OCTET STRING,
        eutra-SCG       OCTET STRING
    }                                           OPTIONAL -- Need M
}
-- TAG-RRCRESUME-STOP
-- ASN1STOP
```

The field conditionalSCG-ToReleaseList indicates which stored conditional SCG configurations the UE 10 would release.

The field conditionalSCG-ConfigList contains the conditional SCG configurations

The field conditional-SK-Counter contains the SK-Counter to be used for any of the conditional SCG configurations.

(Fifth step) Using available idle/inactive measurements as input to trigger condition for conditional SCG addition The UE 10 can use available idle/inactive measurements as input to the triggering condition configuration for SCG addition upon the reception of RRC Resume like message (e.g. RRCResume or RRCConnectionResume). Then, the UE 10 restores the UE 10 context (e.g. restores the UE 10 Inactive AS Context including the conditional SCG configuration and the trigger condition configuration, possibly configured per candidate SCG cell) or maybe relies on a previously restored UE 10 context only used upon reception of RRC Resume. Since both configurations are restored at this point, if the UE 10 has available idle/inactive measurements (previously configured), the UE 10 uses these measurements as input to the restored trigger condition configuration(s). If the triggering condition is then fulfilled to at least one cell, the UE 10 applies the restored conditional SCG configuration associated to the fulfilled condition and perform actions upon i.e. SCG addition to at least one cell fulfilling the trigger condition. The control from the network indicating that the UE 10 should do that may be an indication broadcasted in system information. And, upon trying to resume in a cell the UE 10 reads a system information block and understands it should apply the method if the indication is present. In another alternative this is indicated in paging message addressed to the UE 10. In that solution, there are two variants for the indications to the network regarding the UE 10 actions on the conditional SCG configurations and trigger conditions based on idle/inactive measurements described above. In one variant, the UE 10 includes indication(s) in RRC Resume Request like message, in another variant in RRC Resume Request Complete like message, in another variant in another message e.g. UE 10 Information Response.

In this second solution, as the conditional SCG addition is restored, the network may decide in RRC Resume message to apply delta signaling on it i.e. add more configuration (e.g. for more cell candidates), remove or modify configurations that have been restored.

In a third solution, the UE 10 does not store the conditional SCG configuration(s) and triggering conditions, but may possibly receive them in RRC Resume like message. And, upon reception, the UE 10 uses the idle/inactive measurements that are stored. Indications from the network allowing that to be done may also be provided in RRC Resume for that solution.

In a fourth solution, if the UE 10 has an SCG configuration stored in the UE 10 Inactive AS Context, when the UE 10 initiates the resumption of the connection, it doesn't release the SCG configurations. Instead, but instead in the RRC Resume like message (e.g. RRCResume, RRCConnectionResume), the UE 10 receives an indication to treat the stored SCG configurations as conditional SCG addition configuration, as well as receives associated trigger conditions.

(Fifth Step): The UE 10 uses available stored idle/inactive measurements (e.g. obtained as described in the third step) and any additional indication in the received RRCResume message (e.g. as described in fourth step) and trigger condition configuration (e.g. as described in the first step);

If an indication was received in the RRCResume like message to not use any conditional SCG configurations:

The UE 10 doesn't apply the SCG configuration;

the UE 10 keeps the SCG configurations stored and start to monitor trigger conditions based on connected mode measurements, possibly configured or resumed upon the reception of an RRCResume message (or subsequent RRCReconfiguration message);

This could be implemented e.g. as a single flag in the RRCResume message, e.g. releaseConditionalSCG.

else if indication an indication to partially release the conditional SCG configurations was received in the RRCResume like message (e.g. the conditionalSCG-ToReleaseList described in Step 4):

the UE 10 deletes all (or the indicated) stored SCG configurations;

the UE 10 keeps the remaining SCG configurations stored, if any (i.e. it was a partial SCG deletion) and start to monitor trigger conditions based on connected mode measurements, possibly configured or resumed upon the reception of an RRCResume message (or subsequent RRCReconfiguration message);

else (i.e. indication to add a single or multiple SCG configurations, or to treat the stored SCG configuration as a conditional SCG configuration were received in the RRCResume like message):

the UE 10 checks if the trigger condition for the concerned SCG(s) is (are) fulfilled (i.e. in case of indication i, for only the indicated SCG; in the case of indication ii, for all the indicated SCGs; in the case of indication iii, for all the SCG configuration that are part of the UE 10's context)

In case of indication i, the UE 10 will choose the indicated SCG if it fulfills the trigger condition associated with it. In case of indication ii or iii, the UE 10 will choose the SCG, among the SCGs that have fulfilled the trigger condition associated with them, the one that has the best radio conditions.

This indication may be implemented as e.g.:

```
RRCResume-v16xy-IEs    ::=       SEQUENCE {
    conditionalSCG-ConfigList           SEQUENCE (SIZE
(0..maxConditionalSCG-Id)) OF conditionalSCG-Config
OPTIONAL, -- Need M
    conditional-SK-Counter         SK-Counter           OPTIONAL, -
- Need N
    eventTriggersForSCG-List        SEQUENCE (SIZE
(1..maxConditionalSCG-Id)) OF EventTriggerConfigForSCG-Config
    nonCriticalExtension    SEQUENCE{ }           OPTIONAL
}
EventTriggerConfigForSCG-Config   :: =     SEQUENCE{
    conditionalSCG-Id    INTEGER {0.. maxConditionalSCG-Id},
    eventTriggerConfigForSCG       EventTriggerConfigForSCG
}
ConditionalSCG-Config :: =            SEQUENCE {
    conditionalSCG-Id    INTEGER {1.. maxConditionalSCG-Id}
    radioBearerConfig2        OCTET STRING (CONTAINING
RadioBearerConfig)                OPTIONAL, -- Need M
    mrdc-SecondaryCellGroupConfig            SetupRelease { MRDC-
SecondaryCellGroupConfig }          OPTIONAL, -- Need M
    nonCriticalExtension   SEQUENCE{ }           OPTIONAL
}
```

| RRCResume-IEs field descriptions |
| --- |
| conditionalSCG-ConfigList |
| Includes a list of conditional SCG configurations to be applied if the corresponding condition is triggered |
| conditionalSCG-Id |
| Indicates, the identity of the conditional SCG configuration. Value 0 is used to indicate that the UE 10 shall use the SCG configuration stored in the UE 10 Inactive AS context as conditional SCG configuration. |
| eventTriggerConfigForSCG |
| Indicates the conditions to trigger a specific conditional SCG configuration |

In the example above, the trigger conditions are provided in a separate list as the conditional configurations. In an alternative embodiment, the trigger conditions are provided inside the conditional configurations.

In another embodiment, a single trigger condition is provided for all conditional SCG configuration, and the UE 10 selects only one SCG configuration which triggers the condition. For instance, if multiple candidate SCGs fulfil the condition, the UE 10 may select e.g.:

The first SCG it finds which fulfils the condition,

The SCG which fulfils the condition with the highest margin

The SCG with the highest priority which fulfils the trigger condition (e.g. the first SCG configuration in the list), When the UE 10 resumes the connection to the MCG (i.e. transmits an RRC Resume Request like message), it derives a new master key (KgNB/KeNB) based on the stored key, and a parameter received in RRC Release like message (the Next-hop Chaining Count, NCC). The UE 10 may calculate the secondary key (S-KgNB/S-KeNB) based on the master key and the sk-Counter:

If the UE 10 receives the sk-Counter in RRC Release like message, the UE 10 can calculate one secondary key for each conditional SCG configuration as soon as it has calculated the master key and only activate one of the keys, while release all others when it has selected an SCG; or If the UE 10 receives the sk-Counter in RRC Resume like message, the UE 10 may already have selected an SCG and will calculate a secondary key only for that SCG;

In this fifth step, for the action "upon triggering the resume procedure", there may be different alternatives e.g. on the exact timing in the resume procedure. To realize these solutions in the specifications, one alternative is when the UE 10 stores the conditional SCG addition (e.g. the RRCReconfiguration with at least an SCG configuration) and an associated trigger condition configuration (e.g. like an A4 event) in the UE 10 Inactive AS Context upon transition to INACTIVE (e.g. upon reception of an RRC Release like message).

(Sixth step) Indicating to the network the chosen SCG configuration

If the UE 10 has selected a conditional SCG configuration, either based on configurations stored in INACTIVE, or received during transition to connected mode, the UE 10 can indicate to the network which conditional SCG configuration it has selected.

If the UE 10 is configured with multiple conditional SCG configurations

If the UE 10 has selected one of these configurations:

The UE 10 indicates the chosen SCG to the network (e.g. in RRCResumeComplete)

The UE 10 indicates the chosen SCG to the network by initiating a random access to the SCG Else, the UE 10 will not apply the SCG configuration, and The UE 10 keeps the SCG configurations stored and starts to monitor trigger conditions based on connected mode measurements, possibly configured or resumed upon the reception of an RRCResume message (or subsequent RRCReconfiguration message); or The UE 10 releases the stored conditional SCG configurations If the UE 10 is configured with only a single conditional SCG configuration (e.g. in RRCRelease or RRCResume, or that the stored SCG configuration in the UE 10 Inactive AS Context is converted to a conditional SCG configuration), the UE 10 may indicate to the MN in e.g. RRCResume-Complete:

It has applied conditional SCG configuration using a single flag

```
RRCResumeComplete-v16xx-IEs   ::=  SEQUENCE {
    activatedSCG    ENUMERATED {true}    OPTIONAL
    nonCriticalExtension    SEQUENCE{ }        OPTIONAL
```

Which conditional SCG configuration it has applied, e.g. by providing an identity of the conditional SCG configuration. This could be implemented as e.g.:

```
RRCResumeComplete-v16xx-IEs ::=  SEQUENCE {
    activatedSCG        INTEGER (1.. maxConditionalSCG-Id)
OPTIONAL
    nonCriticalExtension    SEQUENCE{ }        OPTIONAL
}
```

In another embodiment, the UE 10 indicates at least one of the following:

Indicating that the UE 10 had available idle/inactive measurements upon trying to resume; and/or Indicating that the UE 10 has restored the UE 10 AS Inactive context including at least a conditional SCG configuration and an associated trigger condition configuration (e.g. like an A4 event).

Indicating that the UE 10 used the idle/inactive measurements as input to the trigger conditions; and/or Indicating that at least one cell has fulfilled the configured triggered condition (and possibly indicating which cell);

In another embodiment, the UE 10 indicates to the SN that it has selected an SCG by e.g. initiating a random access procedure to the SCG it has selected and transmit a message to the SN after it has performed the random access (e.g. RRCResumeRequest, RRCResumeComplete, RRCReconfigurationComplete, or a new message, or the LTE equivalents).

If the UE 10 sends the RRC Resume Request message to the SN to indicate that it has selected the SCG, the UE 10 could include the same content as in the message it sent to the MN, i.e. resume Identity message (resumeIdentity) for identifying the UE 10 in the MN, resumeMAC-I for authenticating the UE 10 in the MN and the resumeCause. When the SN receives this RRC Resume Request, it will not be able to distinguish it from a normal RRC Resume Request and thus, the SN will send a RETRIEVE UE 10 CONTEXT REQUEST to the MN but the MN would realize that this is a resume request for the SCG as the UE 10 has already resumed.

If the UE 10 sends the RRC Resume Complete message to the SN to indicate that it has selected the SCG, the SN would not expect this message.

The UE 10 may use the secondary key it has derived based on the master key updated based on the NCC and information of the MCG it has resumed in, as well as the sk-Counter the UE 10 has received in RRCRelease or RRCResume. The RRC Resume Complete message would be encrypted and integrity protected using this new secondary key, which allows the SN to authenticate the UE 10.

In an alternative solution, the UE 10 is allowed to send an empty RRC Resume Complete message without ciphering (i.e. only integrity protection).

In another embodiment, the UE 10 uses a new RRC message, e.g. RRCSCGResumeRequest which could either be encrypted and/or integrity protected or un-protected. This message could also contain an identifier e.g. MN or SN specific.

In another embodiment, the UE 10 uses a configured or predefined random access pre-amble to indicate that it is activating a conditional SCG configuration;

Network Methods

Embodiments herein disclose a method in a network node (e.g. a gNodeB or an eNodeB) the method comprising.

Prior to configuring the UE 10 with conditional SCG configurations, the network may:

Decide to suspend a UE 10 to a power saving state (e.g. RRC_IDLE with context, RRC_IDLE without context, RRC_INACTIVE, etc.) and configure the UE 10 with conditional SCG addition configurations.

Obtain conditional SCG addition configurations from candidate network nodes. Alternatively, the UE 10 is already configured with an SCG while in CONNECTED mode and MN decides to use current SCG configurations as conditional SCG addition configurations in the power saving mode.

Decide appropriate trigger conditions. This could be based on network configurations, previous measurements for the particular UE 10, aggregate measurement of multiple UE 10s.

Providing appropriate configurations to the candidate nodes, e.g. security configurations to be used for the conditional SCG configurations.

(First step) Configuring a UE 10 with conditional SCG configurations.

(First step) Configuring a UE 10 with a conditional SCG addition configuration comprising i) a secondary cell group configuration (comprising e.g. CellGroupConfig, RadioBearerConfig, MeasConfig, sk-Counter) and ii) trigger condition configuration(s) (e.g. like an A4 event configuration as defined in ReportConfigNR). The network stores this configuration in the UE 10 context at the network side;

Sending the conditional SCG addition configuration to the UE 10.

Option 1a: while the UE 10 is in CONNECTED state (e.g. via RRCReconfiguration or a new message like RRC-ConditionalReconfiguration); and/or Option 1b: during the UE 10's transition to a power saving state (e.g. IDLE without stored context, IDLE with stored context, INACTIVE, etc. via RRCRelease); and/or Option 1c: if UE 10 is configured with SCG configurations while in CONNECTED mode, the network can send an indication to treat the current SCG configurations as conditional SCG addition configurations to be stored in the UE 10 Context; and/or Option 1d: during the UE 10's transition from a power saving state to a CONNECTED state (e.g. RRCResume)

Sending the trigger condition configuration:

Option 2a: while the UE 10 is in CONNECTED state (e.g. via RRCReconfiguration); and/or Option 2b: during the UE 10's transition to a power saving state (e.g. via RRCRelease); and/or Option 2c: during the UE 10's transition from a power saving state to a CONNECTED state (e.g. RRCResume); and/or Option 2d: via a system broadcast or paging prior/during the transition from a power saving state to a CONNECTED state (Second step) Configuring a UE 10 with idle/inactive measurement configurations In order to trigger the conditional SCG addition configurations, the UE 10 need to perform measurements to evaluate the trigger conditions.

Configuring a UE 10 with an idle/inactive measurement configuration to be used in a power saving state (e.g. IDLE without stored context, IDLE with stored context, INACTIVE, etc.);

- Option 1: configuring the idle/inactive measurement configuration while the UE 10 is in CONNECTED state (e.g. via RRCReconfiguration)
- Option 2: configuring the idle/inactive measurement configuration during the transition to a power saving state (e.g. IDLE without stored context, IDLE with stored context, INACTIVE, etc., via RRCRelease)
- Option 3: configuring the UE 10 with idle/inactive measurement configuration while the UE 10 is in a power saving state (e.g. IDLE without stored context, IDLE with stored context, INACTIVE, etc., via system information broadcast)

(Third step) Transitioning a UE 10 to a power saving state and perform idle/inactive measurements Sending a message to the other nodes which have, or can provide conditional SCG configuration indicating:

That the UE 10 is to be suspended and provide the security configurations to be associated with the conditional SCG configuration; and/or Receiving a message from the candidate SN nodes containing the conditional SCG configurations;

Transitioning a UE 10 to enter a power saving state (e.g. IDLE without stored context, IDLE with stored context, INACTIVE, etc.), e.g., transmitting an RRC Release like message (with or without a suspendConfig);

This message may or may not contain the conditional SCG configurations to be used upon resumption;

(Fourth step) Adding SCG upon RRC Resume based on conditional SCG addition configurations When a UE 10 with conditional SCG addition configurations stored in the UE 10 AS Inactive Context attempts to resume the connection by sending the RRC Resume Request like message to a network node and check which candidate configurations the UE 10 have stored.

The target network node, e.g. the second radio network node 13, can optionally prepare at least one candidate network nodes using e.g. (conditional) SCG addition request.

In addition, the target network node can optionally release at least on candidate network node, which shouldn't remain as a candidate target for conditional SCG addition, e.g. using a SCG release.

In one embodiment, the target network node indicates in the RRC Resume like message whether the UE 10 may restore the conditional SCG addition configurations or not.

In another embodiment, the target network node provides the UE 10 with an indication of which of the conditional SCG addition configuration(s) can be restore, i.e. only a subset of the conditional SCG addition configuration(s) are restored, e.g. using an SCG ID or a conditional SCG ID.

In another embodiment, the target network node provides updated conditional SCG addition configuration(s) e.g. by adding, modifying or removing conditional SCG addition configurations.

In another embodiment, the target network node provides the trigger conditions in the RRC Resume like message (i.e. the UE 10 have not stored any trigger conditions already in the UE 10 AS Inactive Context).

In another embodiment, the target network node modifies the stored trigger conditions in the UE 10 AS Inactive Context before the UE 10 restores them, alternatively modifies them after the UE 10 has restored them.

In another embodiment, if the UE 10 only has a stored SCG configuration in the UE 10 Inactive AS Context (i.e. a regular SCG configuration and not a conditional SCG addition configuration); the target network node includes a trigger condition for conditional SCG addition which is either implicitly or explicitly associated to the stored SCG configuration.

In a candidate network node, embodiments herein disclose methods to receive a request from a source network node to maintain or release a conditional SCG configuration.

In another embodiment, a network node operating as a secondary node receive an indication from a network node operating as master node to convert the current SCG configurations to a conditional SCG addition configuration and to send an acknowledgement back to the master network node.

In another embodiment, the candidate network node may receive a request from a UE 10 to resume a conditional SCG configuration.

(Fifth step) Send RRC resume like message to the UE 10 to configure or resume conditional SCG configurations In one embodiment, the network sends an RRC Resume like message to the UE 10 indicating the network decision regarding the conditional SCG configurations e.g.:

Conditional SCG configurations; and/or

Indication that the UE 10 shall use idle/inactive measurements for activating conditional SCG configurations; and/or Indication that the UE 10 shall add a conditional SCG configurations; and/or Indication that the UE 10 shall release (one or more) stored conditional SCG configurations;

There may also be a default solution e.g. UE 10 monitors the conditions for the configured conditional SCG configurations and if any of these triggers, the UE 10 activates this configuration.

(Sixth step) Receiving an indication from the UE 10 the chosen SCG configuration (Sixth step) The network receives an RRC Resume Complete message from the UE 10 indicating that the UE 10 has applied the configurations received in the RRC Resume like message:

In one embodiment, the MN receives an indication from the UE 10 that it has applied a conditional SCG configuration (e.g. in the RRCResumeComplete message). This indication could be e.g.:

That the UE 10 has applied a conditional SCG configuration (e.g. if there is only a single conditional configuration);

Which configuration the UE 10 has applied (e.g. SCG ID if there are multiple configurations);

That the UE 10 has released the stored conditional SCG configurations since none triggered the conditions In another embodiment, the SN receives an indication that a UE 10 has activated a conditional SCG configuration e.g. by:

Receiving a random access preamble from a UE 10 which it has a configured conditional SCG configuration (e.g. an SCG C-RNTI);

Receiving a configured or pre-defined random access preamble from a UE 10 which it has a stored conditional SCG configuration;

Receive a message from the UE 10 after it has performed the random access (e.g. RRCResumeComplete, RRCReconfigurationComplete, or a new message, or the LTE equivalents)

If the SN receives an indication from the UE 10 that the UE 10 has selected an SCG, the SN can send a message to the MN to indicate this.

Figure 10:
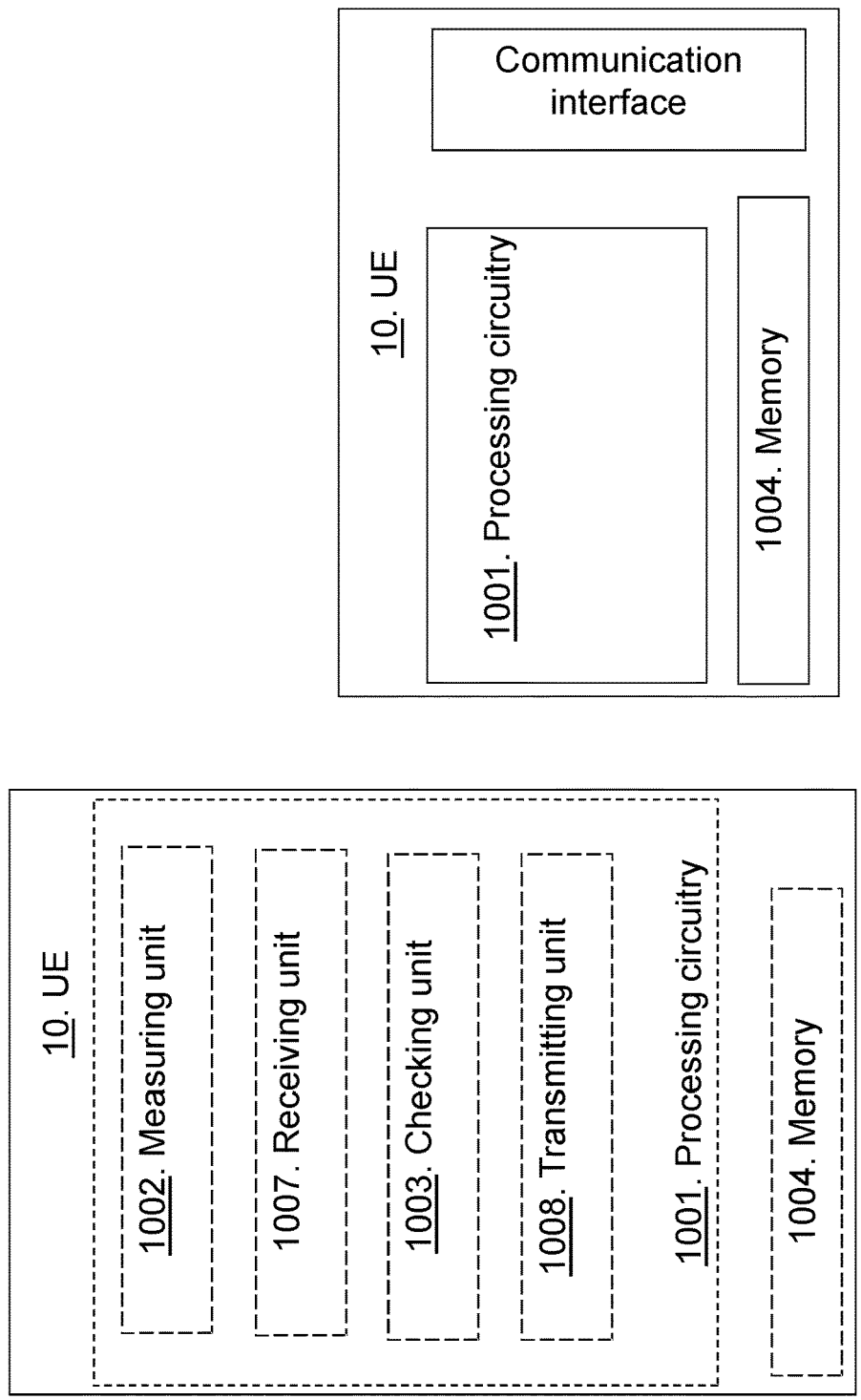
FIG. 10 is a block diagram depicting a UE according to embodiments herein.
Figure 10:
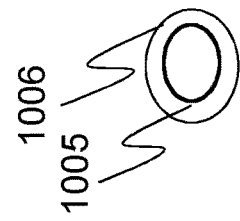

FIG. 10 is a block diagram depicting the UE 10 for handling communication according to embodiments herein.

The UE 10 may comprise processing circuitry 1001, e.g. one or more processors, configured to perform the methods herein.

The UE 10 may comprise a measuring unit 1002. The UE 10, the processing circuitry 1001, and/or the measuring unit 1002 is configured to measure in a dormant state according to an early measurement configuration for one or more configured SCG configurations.

The UE 10 may comprise a checking unit 1003. The UE 10, the processing circuitry 1001, and/or the checking unit 1003 is configured to, upon transition to a connected state, compare the measurement to one or more trigger conditions associated with the one or more SCG configurations.

The UE 10 may comprise a receiving unit 1007. The UE 10, the processing circuitry 1001, and/or the receiving unit 1003 is configured to receive configuration from the radio network node 12.

The UE 10 may comprise a transmitting unit 1008. The UE 10, the processing circuitry 1001, and/or the transmitting unit 1008 is configured to transmit resume message, message upon trigger condition is met, and/or the like.

The UE 10 further comprises a memory 1004. The memory comprises one or more units to be used to store data on, such as trigger conditions, measurements, configurations, applications to perform the methods disclosed herein when being executed, and similar. The UE 10 may comprise a communication interface e.g. one or more antennas.

The methods according to the embodiments described herein for the UE 10 are respectively implemented by means of e.g. a computer program product 1005 or a computer program, comprising instructions, i.e., software code portions, which, when executed on at least one processor, cause the at least one processor to carry out the actions described herein, as performed by the UE 10. The computer program product 1005 may be stored on a computer-readable storage medium 1006, e.g. a disc, a universal serial bus (USB) stick or similar. The computer-readable storage medium 1006, having stored there on the computer program, may comprise the instructions which, when executed on at least one processor, cause the at least one processor to carry out the actions described herein, as performed by the UE 10. In some embodiments, the computer-readable storage medium may be a transitory or a non-transitory computer-readable storage medium.

Figure 11:
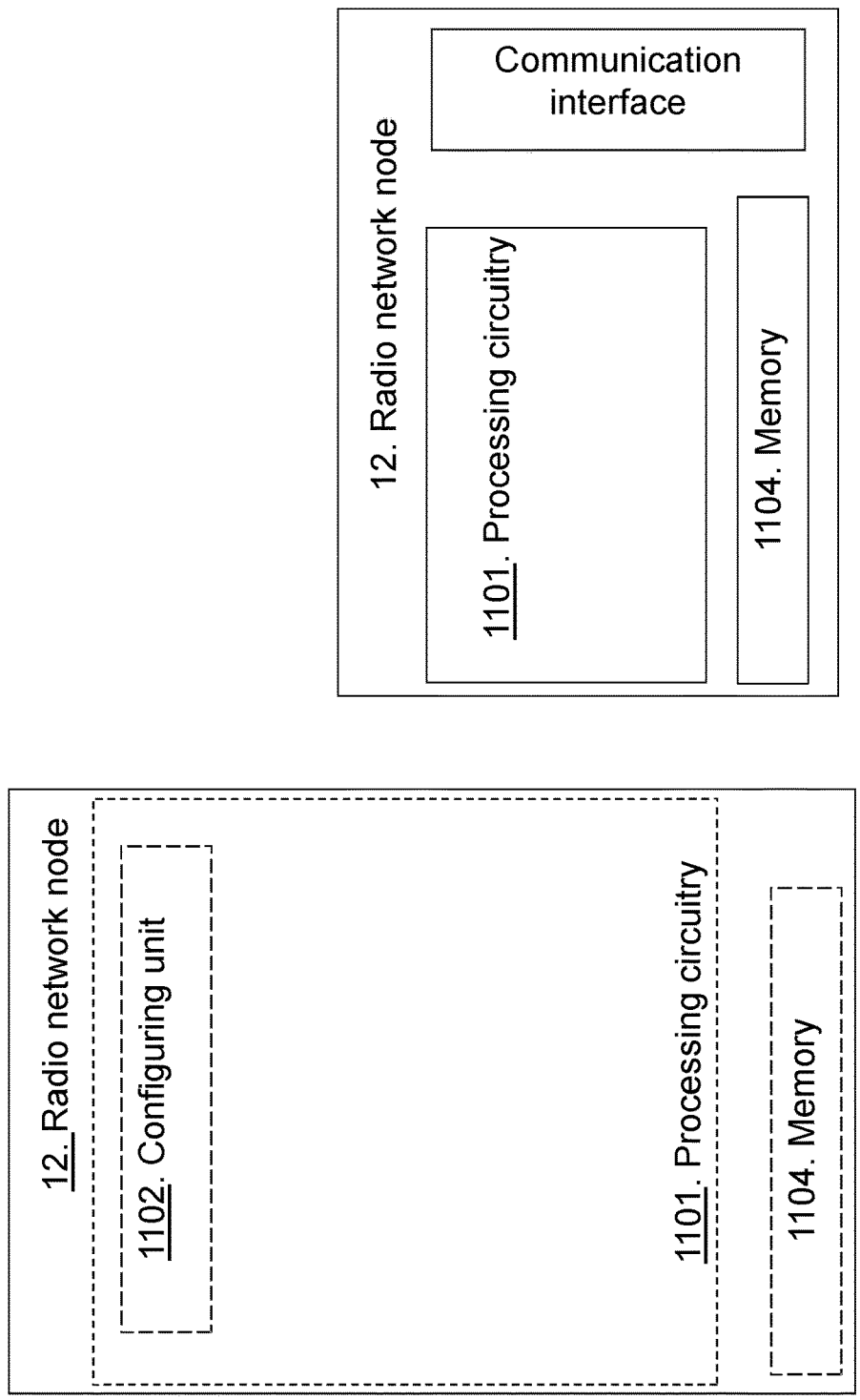
FIG. 11 is a block diagram depicting a radio network node according to embodiments herein.

FIG. 11 is a block diagram depicting the radio network node 12 for handling communication according to embodiments herein.

The radio network node 12 may comprise processing circuitry 1101, e.g. one or more processors, configured to perform the methods herein.

The radio network node 12 may comprise a configuring unit 1102. The radio network node 12, the processing circuitry 1101, and/or the configuring unit 1102 is configured to transmit configurations to the UE 10. E.g. configured to transmit configuration data with early measurement configuration, which the UE 10 uses to perform measurements in dormant state. The radio network node 12, the processing circuitry 1101, and/or the configuring unit 1102 is configured to transmit configuration data to the UE 10 with one or more SCG configuration(s) that are stored by the UE 10 and/or the radio network node while the UE 10 is in dormant state. The radio network node 12, the processing circuitry 1101, and/or the configuring unit 1102 may further be configured to transmit configuration data with one or more trigger conditions, associated with the one or more SCG configurations.

The radio network node 12 further comprises a memory 1104. The memory comprises one or more units to be used to store data on, such as trigger conditions, measurements, configurations, applications to perform the methods disclosed herein when being executed, and similar. The radio network node 12 may comprise a communication interface e.g. one or more antennas.

The methods according to the embodiments described herein for the radio network node 12 are respectively implemented by means of e.g. a computer program product 1105 or a computer program, comprising instructions, i.e., software code portions, which, when executed on at least one processor, cause the at least one processor to carry out the actions described herein, as performed by the radio network node 12. The computer program product 1105 may be stored on a computer-readable storage medium 1106, e.g. a disc, a universal serial bus (USB) stick or similar. The computer-readable storage medium 1106, having stored there on the computer program, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment such as e.g. the UE 10, is used and it refers to any type of wireless device communicating with a network node and/or with another wireless device in a cellular or mobile communication system. Examples of UE 10 are target device, device to device (D2D) UE 10, proximity capable UE 10, aka Proximity Services (ProSe) UE, machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
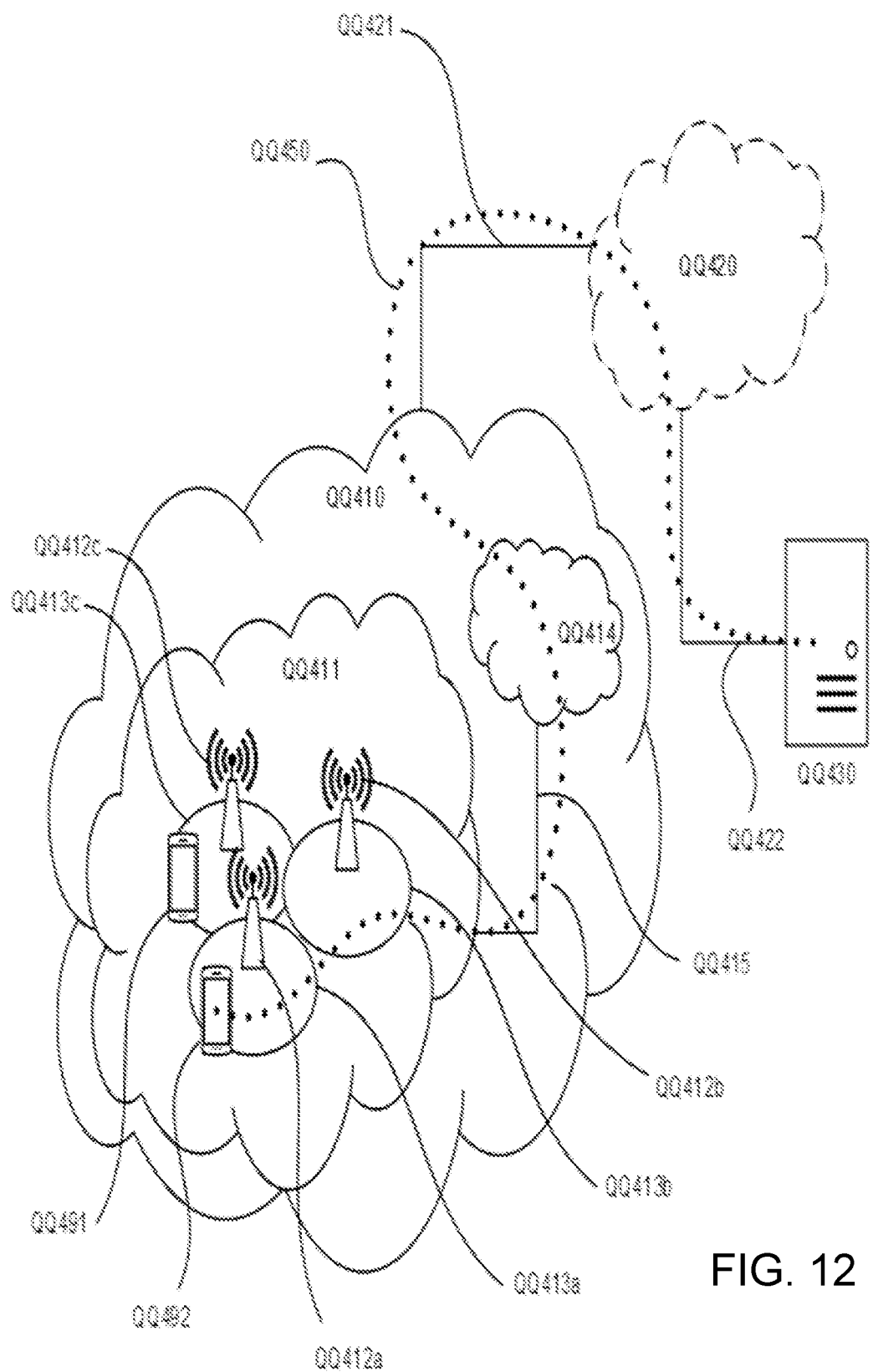
FIG. 12 shows a telecommunication network connected via an intermediate network to a host computer in accordance with some embodiments.

FIG. 12: Telecommunication network connected via an intermediate network to a host computer in accordance with some embodiments With reference to FIG. 12, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the wireless device 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 12 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 13:
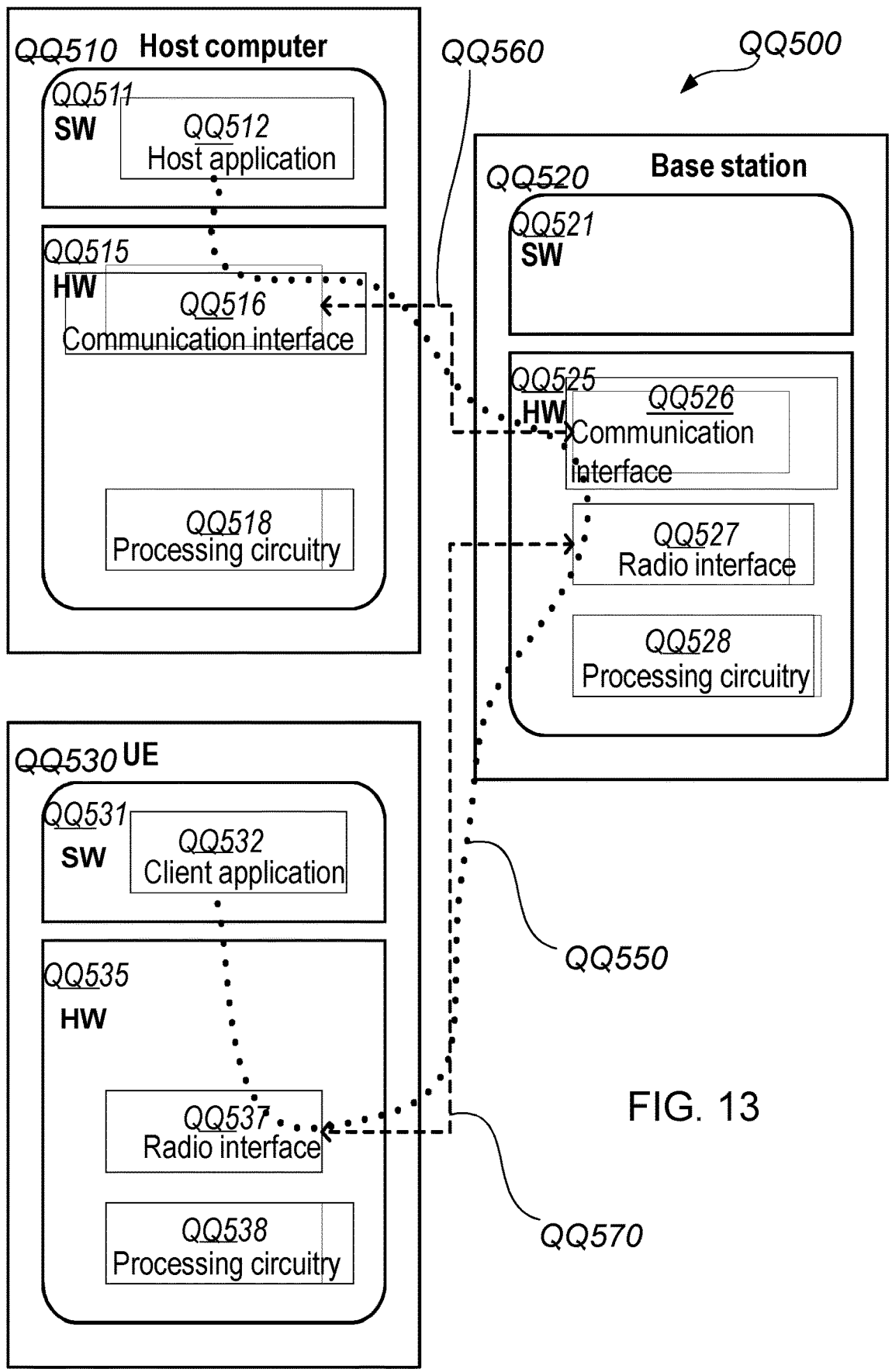
FIG. 13 shows a host computer communicating via a base station with a user equipment over a partially wireless connection in accordance with some embodiments.

FIG. 13: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 13. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 13) served by base station 3320. Communication interface 3326 may be configured to facilitate connection 3360 to host computer 3310. Connection 3360 may be direct or it may pass through a core network (not shown in FIG. 13) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3336, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3336. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 13 may be similar or identical to host computer 3230, one of base stations 3212a, 3212b, 3212c and one of UEs 3291, 3292 of FIG. 12, respectively. This is to say, the inner workings of these entities may be as shown in FIG. 13 and independently, the surrounding network topology may be that of FIG. 12.

In FIG. 13, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency since connection to SCG is performed early and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 14: Methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Abbreviation Explanation

3G Third Generation of Mobile Telecommunications Technology
BSM Basic Safety Message
BW Bandwidth
BSR Buffer Status Report
CAM Cooperative Awareness Message
CBR Channel Busy Ratio
DPTF Data Packet Transmission Format
D2D Device-to-Device Communication
DENM Decentralized Environmental Notification Message
DSRC Dedicated Short-Range Communications
eNB eNodeB
ETSI European Telecommunications Standards Institute
LTE Long-Term Evolution
NW Network
RS Reference Signals
TF Transport Format
SAE Society of the Automotive Engineers
UE User Equipment
V2I Vehicle-to-Infrastructure
V2P Vehicle-to-Pedestrian
V2V Vehicle-to-(vehicle) communication
V2x Vehicle-to-anything-you-can-imagine
wrt with respect to
SPS Semi Persistent Scheduling
DMRS Demodulation reference signals
OCC Orthogonal cover code
PDCCH Physical Downlink Control Channel
DBS Delay-Based Scheduler
MAC Medium Access Control
MAC CE MAC Control Element
PUSCH Physical Uplink Shared Channel
PUCCH Physical Uplink Control Channel
PDU Packet Data Unit
3GPP Third Generation Partnership Project
LCID Logical Channel Identity
MAC Medium Access Control
MAC CE Medium Access Control—Control Element
RRC Radio Resource Control
IP Internet Protocol
PPPP ProSe Per Packet Priority
ProSe Proximity Services
PRB Physical Resource Block
SL Sidelink
SPS Semi-Persistent Scheduling
UL Uplink
DL Downlink
LCG Logical Channel Group
SFN System Frame Number
TTI Transmission Time Interval
SCI Sidenlink Control Information
CA Carrier Aggregation
SLRB Sidelink Radio Bearer
UICC Universal Integrated Circuit Card
ME Mobile Equipment
ID Identifier
PDB Packet Delay Budget
CBR Congestion Busy Ratio
SDU Service Data Unit
PDU Protocol Data Unit BLER Block Error Rate
CRG Communication Requirement Group
AS Access stratum

The invention claimed is:

1. A method performed by a user equipment (UE) for receiving configuration data in a wireless communication network, the method comprising:
   receiving configuration data from a network node for configuring the UE with the following:
      an early measurement configuration, by which the UE is configured to perform measurements in a dormant state, and
      one or more secondary cell group (SCG) configurations that are to be stored by at least one of the UE or the radio network node while the UE is in the dormant state;
   performing early measurements in the dormant state according to the early measurement configuration; and
   upon transition to a connected mode, comparing the early measurements to one or more trigger conditions associated with the one or more SCG configurations.

2. The method according to claim 1, wherein the UE compares the early measurements to the one or more trigger conditions without reporting the early measurements to the wireless communication network.

3. The method according to claim 1, wherein comparing the early measurements to one or more trigger conditions associated with the one or more SCG configurations comprises checking whether the trigger conditions are fulfilled for the one or more SCG configurations; and
   the method further comprises:
      when the trigger conditions are fulfilled, applying the associated SCG configuration; and
      otherwise performing any one of the following: releasing the SCG configurations, or keeping the SCG configurations stored.

4. The method according to claim 1, wherein, when more than one SCG configurations satisfy the trigger condition associated with the SCG configuration, selecting any one of the following:
   the SCG configuration that has the best radio conditions;
   the SCG configuration which exceeds its trigger condition the most;
   the SCG configuration with the highest priority; or
   the first SCG configuration that the UE finds that fulfills the trigger condition.

5. The method according to claim 1, wherein:
   the configuration data comprises the one or more trigger conditions associated with the one or more SCG configurations; and
   the method further comprises:
      when the trigger conditions are fulfilled, applying the associated SCG configuration;
      otherwise, performing any one of the following:
         releasing the SCG configurations, or
         keeping the SCG configurations stored.

6. The method according to claim 1, and wherein the configuration data comprises a secondary keys counter (sk-Counter) to be used to derive secondary keys associated to Secondary Nodes (SNs) upon resumption, wherein the sk-Counter comprises a separate sk-Counter for each one of the configured SCG configurations.

7. The method according to claim 1, wherein:
   performing the early measurements in the dormant state according to the early measurement configuration is performed for the one or more configured SCG configurations.

8. A method performed by a radio network node for enabling or handling communication of a user Equipment (UE) in a wireless communication network, the radio network node serving the UE, the method comprising:
   configuring the UE with configuration data including the following:
      an early measurement configuration based on which the UE is to perform measurements while in a dormant state with respect to the wireless communication network; and
      one or more SCG configurations to be stored by the UE while the UE is in the dormant state, wherein:
         each SCG configuration is associated with a trigger condition for the measurements performed by the UE in the dormant state, and
         fulfillment of a trigger condition causes the UE to apply the associated SCG configuration when exiting the dormant state and entering a connected mode with respect to the wireless communication network.

9. The method according to claim 8, wherein the configuring the UE is performed by transmitting the configuration data to the UE.

10. The method according to claim 9, and wherein the configuration data comprises a secondary keys counter (sk-Counter) to be used by the UE to derive secondary keys associated to Secondary Nodes (SNs) upon resumption of the UE, wherein the sk-Counter comprises a separate sk-Counter for each one of the SCG configurations to be configured in the UE.

11. A user equipment (UE) for receiving configuration data in a wireless communication network, the UE comprising:
   at least one processor; and
   a memory storing instructions, which when executed by the at least one processor, cause the UE to:
      receive configuration data from a network node, for configuring the UE:
         with early measurement configuration, for which the UE is configured to perform measurements in a dormant state, and
         with one or more secondary cell group (SCG) configuration that are to be stored by at least one of the UE or the radio network node while the UE is in the dormant state;
      perform early measurements in a dormant state according to the early measurement configuration; and
      upon transition to a connected mode, compare the early measurements to one or more trigger conditions associated with the one or more SCG configurations.

12. The UE according to claim 11, wherein the instructions, when executed by the at least one processor, further cause the UE to compare the early measurements to the one or more trigger conditions without reporting the early measurements to the wireless communication network.

13. The UE according to claim 11, wherein the instructions, when executed by the at least one processor, further cause the UE to compare the early measurements to the one or more trigger conditions associated with the one or more SCG configurations by checking whether the trigger conditions are fulfilled for the one or more SCG configurations, and
   when the trigger conditions are fulfilled, apply the associated SCG configuration,
   when the trigger conditions are not fulfilled, performing any one of:
      releasing the SCG configurations, or
      keeping the SCG configurations stored.

14. The UE according to claim 11, wherein the instructions, when executed by the at least one processor, further cause the UE to when more than one SCG configurations satisfies the trigger condition associated with the SCG configuration, select any one of:
  the SCG configuration that has the best radio conditions; or
  the SCG configuration which exceeds its trigger condition the most; or
  the SCG configuration with the highest priority; or
  the first SCG configuration the UE finds that fulfills the trigger condition.

15. The UE according to claim 11, wherein:
  the configuration data comprises the one or more trigger conditions associated with the one or more SCG configurations; and
  the instructions, when executed by the at least one processor, further cause the UE to:
    when the trigger conditions are fulfilled, apply the associated SCG configuration;
    when the trigger conditions are not fulfilled, perform any one of:
      releasing the SCG configurations, or
      keeping the SCG configurations stored.

16. The UE according to claim 11, wherein the configuration data comprises a secondary keys-counter (sk-Counter) to be used to derive secondary keys associated to Secondary Nodes (SNs) upon resumption, wherein the sk-Counter comprises a separate sk-Counter for each one of the configured SCG configurations.

17. The UE according to claim 11, wherein the instructions, when executed by the at least one processor, further cause the UE to:
  perform the early measurements in the dormant state according to the early measurement configuration for the one or more configured SCG configurations.

18. A radio network node for enabling or handling communication of a user equipment (UE) in a wireless communication network, the radio network node configured to serve the UE, the radio network node comprising:
  at least one processor; and
  a memory storing instructions, which when executed by the at least one processor, cause the radio network node to:
    configure the UE with configuration data including the following:
      an early measurement configuration based on which the UE is to perform measurements while in a dormant state with respect to the wireless communication network; and
      one or more SCG configurations to be stored by the UE while the UE is in the dormant state, wherein:
        each SCG configuration is associated with a trigger condition for the measurements performed by the UE in the dormant state, and
        fulfillment of a trigger condition causes the UE to apply the associated SCG configuration when exiting the dormant state and entering a connected mode with respect to the wireless communication network.

19. The radio network node according to claim 18, wherein the instructions, when executed by the at least one processor, further cause the radio network node to configure the UE by transmitting the configuration data to the UE.

20. The radio network node according to claim 19, wherein the configuration data comprises a secondary keys-counter (sk-Counter) to be used by the UE to derive secondary keys associated to Secondary Nodes (SNs) upon resumption of the UE.

21. The radio network node according to claim 20, wherein the sk-Counter comprises a separate sk-Counter for each one of the SCG configurations to be configured in the UE.

* * * * *